(12) United States Patent
Ishii

(10) Patent No.: US 7,639,391 B2
(45) Date of Patent: Dec. 29, 2009

(54) IMAGE FORMING APPARATUS AND METHOD THEREOF

(75) Inventor: Akira Ishii, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 903 days.

(21) Appl. No.: 10/667,382

(22) Filed: Sep. 23, 2003

(65) Prior Publication Data
US 2004/0109184 A1 Jun. 10, 2004

(30) Foreign Application Priority Data
Dec. 9, 2002 (JP) ............................. 2002-356795

(51) Int. Cl.
H04N 1/52 (2006.01)
H04N 1/58 (2006.01)
(52) U.S. Cl. .................... 358/1.9; 358/3.06; 358/533; 358/3.26; 358/536; 358/534; 358/518; 358/530; 358/296; 358/298
(58) Field of Classification Search ............... 358/3.06, 358/1.9, 533, 3.26, 536, 534
See application file for complete search history.

(56) References Cited

U.S. PATENT DOCUMENTS

| | | | |
|---|---|---|---|
| 4,084,183 A | | 4/1978 | Keller et al. |
| 4,185,304 A | | 1/1980 | Holladay |
| 4,185,604 A | | 1/1980 | Nagaishi et al. |
| 5,055,923 A | * | 10/1991 | Kitagawa et al. ............ 358/534 |
| 5,155,599 A | * | 10/1992 | Delabastita ................ 358/3.07 |
| 5,455,682 A | | 10/1995 | Ikuta |
| 6,185,014 B1 | * | 2/2001 | Ishii ........................... 358/536 |
| 2002/0089708 A1 | * | 7/2002 | Cheng et al. ................ 358/534 |

FOREIGN PATENT DOCUMENTS

DE 2012728 9/1971

(Continued)

OTHER PUBLICATIONS

Rosenfeld et al, "Digital Picture Processing", pp. 67-81.
Holladay, "An Optimum Algorithm For Halftone Generation for Displays and Hard Copies", Proceedings of the SID, Vo. 21/2, 1980, pp. 185-192.
Delabastita, "Screening Techniques, Moire in Four Color Printing", TAGA conference, Vancouver B.C., Apr. 1992, pp. 44-65.
Peter Fink, "PostScript Screening", Chapter 4, pp. 43-61.

*Primary Examiner*—King Y Poon
*Assistant Examiner*—Quang N Vo
(74) *Attorney, Agent, or Firm*—Oliff & Berridge, PLC

(57) ABSTRACT

To reduce low-frequency moiré in secondary colors and tertiary colors in four color screens, between at least two halftone screens, screen vectors wa2, wb2 are arranged to match each other, while other screen vectors are arranged not to match each other. A halftone screen is an orthogonal screen in which screen vector wa2 is perpendicular to basis vector ra1. A halftone screen is a non-orthogonal screen in which screen vector wb2 is perpendicular to basis vector rb1. When screen vector wa2 matches screen vector wb2, spatial frequency spectra corresponding to screen vectors wa2 and wab2, match each other. With such a relationship, because a pair of spatial frequency spectra can match each other between two colors, wider intervals can be provided for the spatial frequency spectra of the remaining colors of four colors, which would suppress low-frequency moiré.

15 Claims, 32 Drawing Sheets

FOREIGN PATENT DOCUMENTS

| | | |
|---|---|---|
| DE | 10084354 T | 4/2002 |
| EP | 1 202 558 A2 | 5/2002 |
| JP | A-03-214864 | 9/1991 |
| JP | A 5-257268 | 10/1993 |
| JP | A-06-046275 | 2/1994 |
| JP | A-09-058056 | 3/1997 |
| JP | A 2000-50071 | 2/2000 |
| JP | A-2002-044445 | 2/2002 |
| WO | WO 00/56062 | 9/2000 |

* cited by examiner (1) Y · M
(2) Y · K
(3) M · C
(4) M · K
(5) Y · M · C
(6) M · C · K

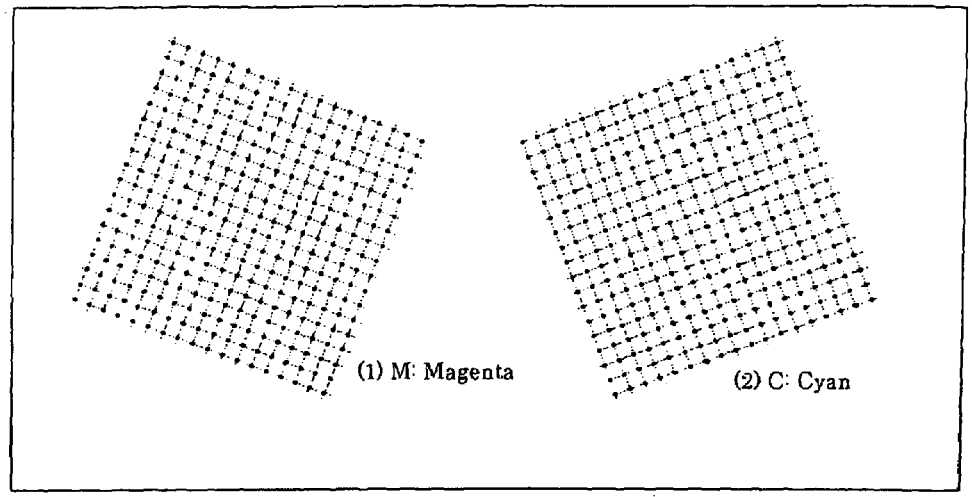
PRIOR ART    FIG. 8A
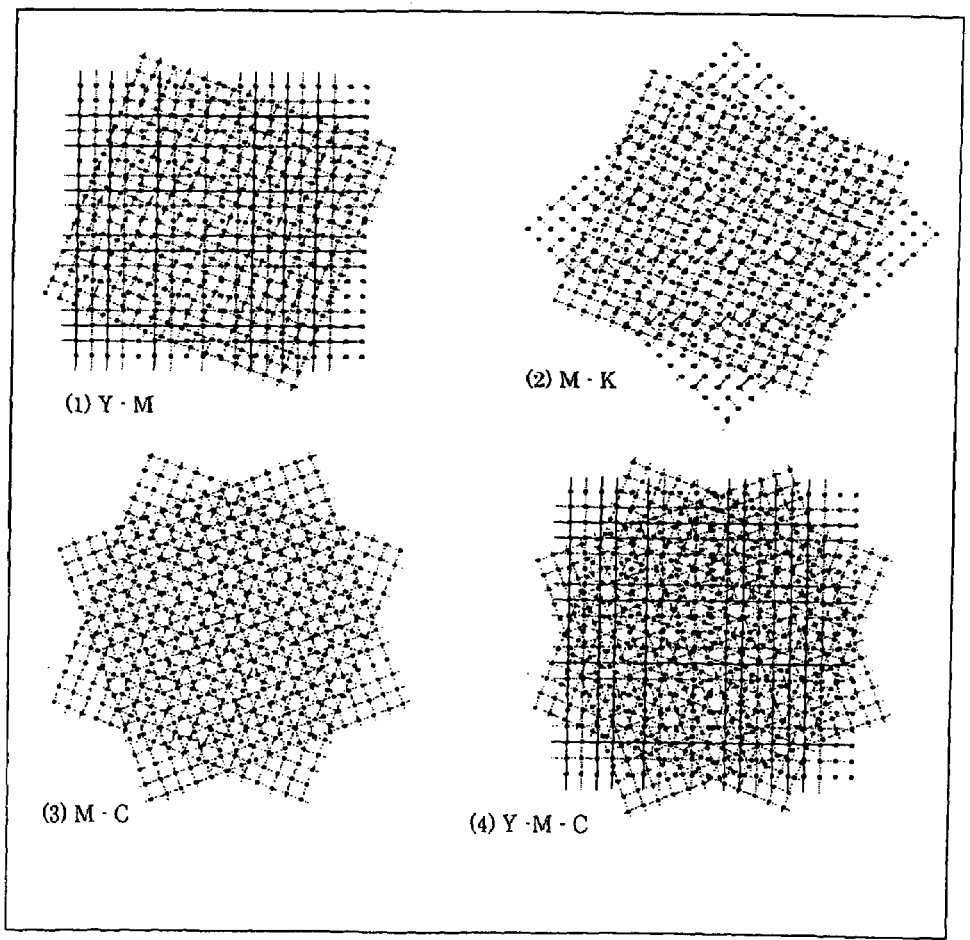
PRIOR ART    FIG. 8B

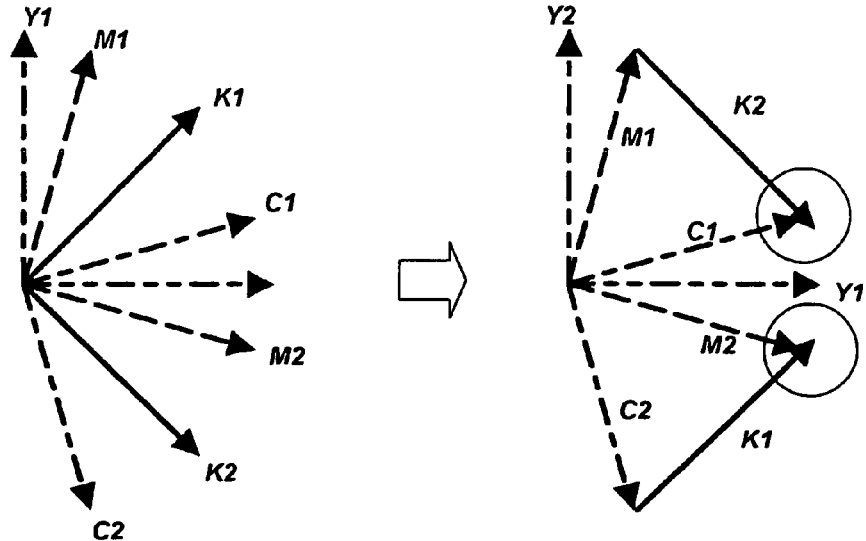
(a) 165 lpi  PREFERENTIALLY M, C, K ARRANGED PATTERNS
(CORRESPONDING TO FIG. 2)
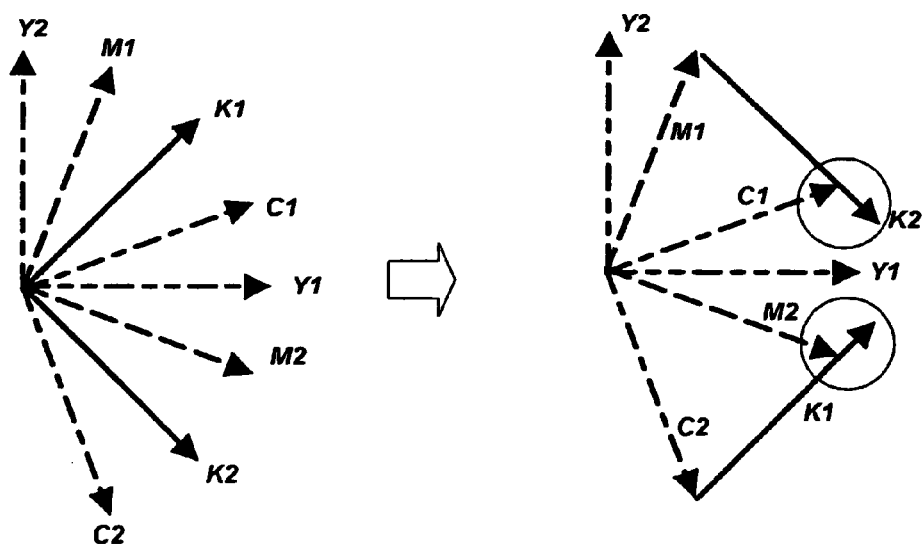
(b) 170 lpi  EVENLY ARRANGED 4-COLOR PATTERNS
(CORRESPONDING TO FIG. 6)
PRIOR ART
FIG. 9

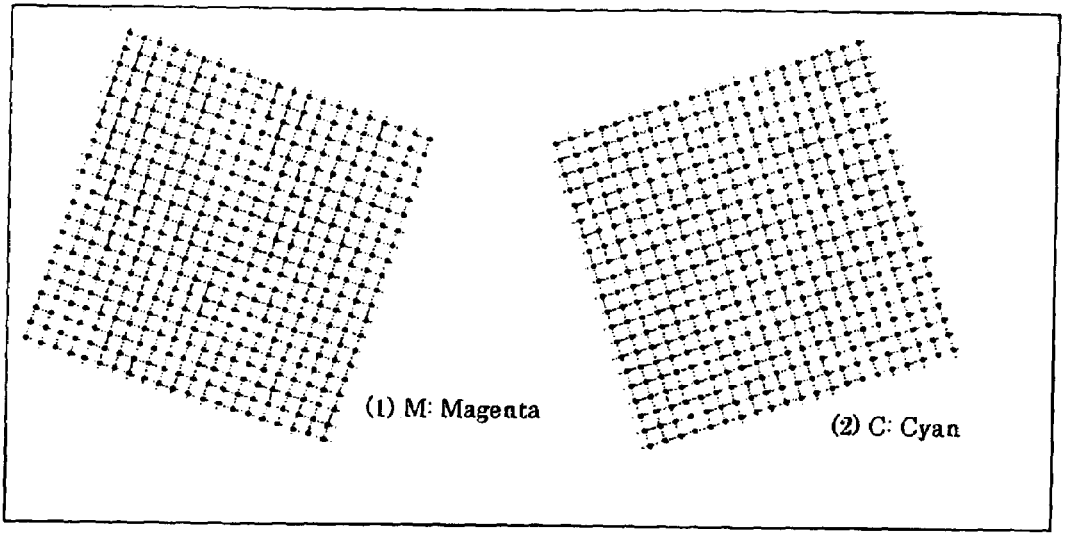
PRIOR ART     FIG. 13A
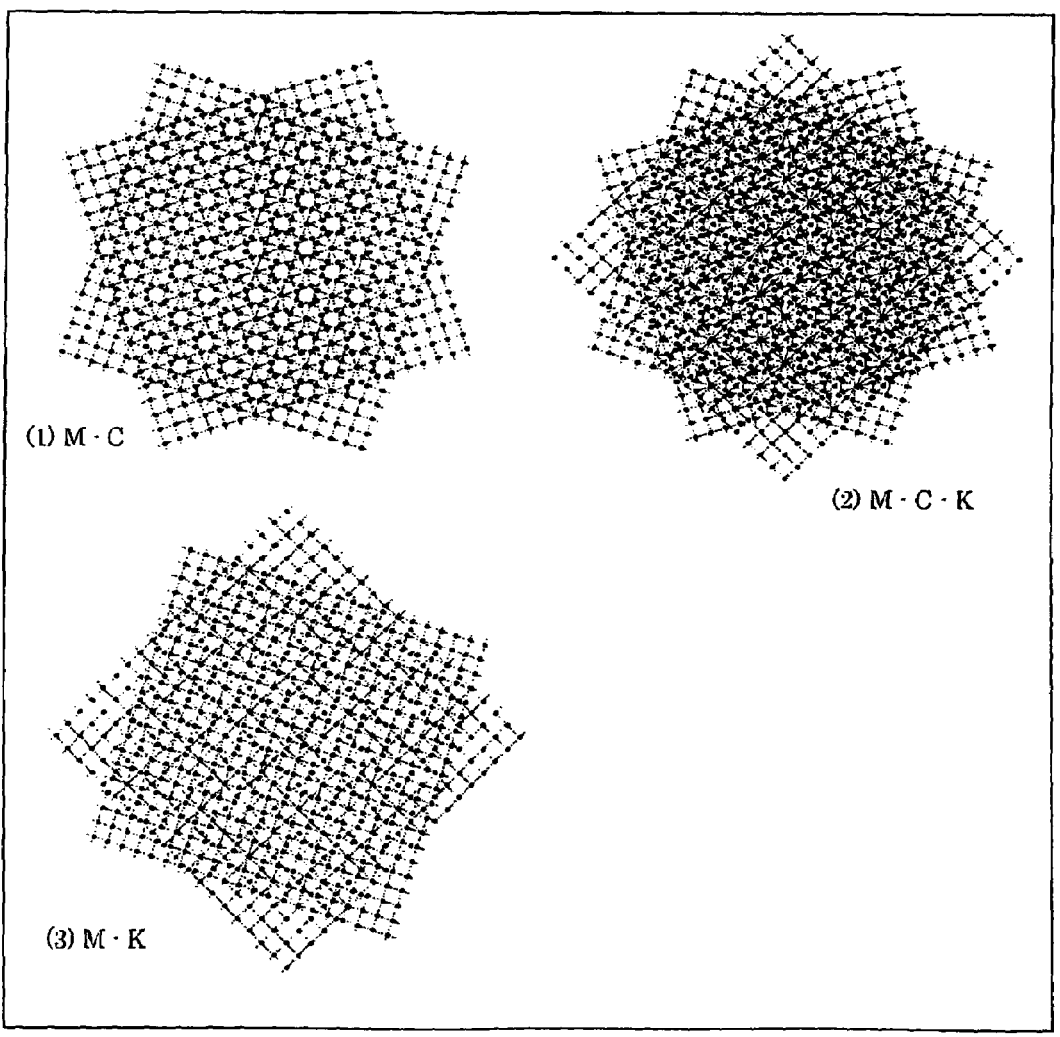
PRIOR ART     FIG. 13B (1) M: Magenta    (2) C: Cyan (3) Y: Yellow    (4) K: Black

IMAGE FORMING APPARATUS AND METHOD THEREOF

BACKGROUND OF THE INVENTION

1. Field of the Invention

The present invention relates to an image processing apparatus which reproduces a full-color image by converting multilevel image data obtained by color separation into a halftone image for each color and then superimposing the converted halftone images on one another.

2. Description of the Related Art

The technique of dithering is widely employed as a technique for binarization or digitization in tone reproduction using a halftone screen. In dithering, matrices comprising a plurality of pixels are arranged at regular intervals to form a screen structure. The ON/OFF status of each of the pixels in the matrix is determined by comparing input signals with a conversion table, designated as a threshold matrix, a dither matrix, or the like, describing relationship between output of the pixel and an input image signal. Then, several adjoining pixels are switched between ON and OFF to generate halftone dots, and tone reproduction is carried out according to the sizes of the generated halftone dots. In color reproduction, by changing screen angles on a color basis, color variations due to expansion or contraction or variations in the positions of printing plates are suppressed by using a different screen angle for each color. However, interference of the screens having the different screen angles produces a visible low-frequency moiré.

In order to conduct an analysis of problems associated with spatial frequencies resulting from such halftone dot structures, basis vectors as described by A. Rosenfeld, A. C. Kak in Chapter 4 of "Digital Picture Processing", Academic Press 1982 are defined for halftone dot patterns as shown in FIG. 1. An example shown in FIG. 1 represents a screen set consisting of screens for M (magenta), C (cyan), and K (black) preferentially allocated at screen angles in approximately 30 degree intervals (M at 74°, C at +16°, K at +45°) and a screen for Y (yellow) subsequently allocated at a screen angle of 0°, which is commonly used in a printing field. The example of FIG. 1 shows that a dot pattern in each color screen is an orthogonal screen. In FIG. 1, the placement of adjacent 2×2 halftone dots 100, 102, 104, and 106, and basis vectors Y1, Y2, K1, K2, M1, M2, C1, and C2 corresponding to the halftone dots are depicted. For example, basis vectors Y1 and Y2 of Y are vectors extending from a halftone dot 100-0 to adjacent screen dots 100-1 and 100-2 in the halftone dot structure of the Y screen, respectively.

From the basis vectors, spatial frequency spectra in the halftone dot structure can be defined. Writing as a general formula, reciprocal basis vectors w1 and w2, which satisfy the relationship in the following equations:

$$ri \cdot wj = 0 \text{ (where } i \neq j \text{ and } i, j \text{ is 1 or 2) and } ri \cdot wj = 1 \text{ (where } i = j\text{),}$$

are defined for basis vectors r1 and r2, respectively. Considering the reciprocal basis vectors w1 and w2 as position vectors starting from the origin of a spatial frequency plane, the end points of reciprocal basis vectors w1 and w2 represent spatial frequency spectra in each direction. Detailed explanation about the basis vectors and the spatial frequency spectra is provided in Chapter 4 of "Digital Picture Processing" The reciprocal basis vectors described in Chapter 4 of "Digital Picture Processing" are hereafter referred to as "screen vectors" relative to a halftone screen.

FIG. 2 is a graphic plot of basis vectors of a 4-color screen set equivalent to the example of FIG. 1, which shows an example of approximately 165 lpi (lines per inch) designed with a resolution of 2400 dpi (dots per inch). In FIG. 2, the width of squares constituting a grid corresponds to 2 pixels at 2400 dpi. FIG. 3 shows spatial frequency spectra derived from the basis vectors of the 4-color screen set, which are separately plotted in their respective maps as two groups of spectra, primary spectra (the spatial frequency spectra corresponding to basis vectors Y1, Y2, K1, K2, M1, M2, C1, and C2) and secondary spectra (the spatial frequency spectra corresponding to vectors represented by the sum or the difference of the basis vectors).

FIG. 4 shows screen dot patterns for colors M, C, Y, and K defined by the basis vectors of FIG. 2, and FIG. 5 shows superimposed dot patterns of the screens for the colors. Because, in the screen set corresponding to the basis vectors of FIG. 2, the screens for M, C, and K having a high contrast in monochromatic lightness are preferentially arranged at angular intervals of approximately 30 degrees, an interval between the spatial frequency spectra for the three colors is wide, i.e. approximately 84 lpi. Such a wide spectrum interval is less prone to generate moiré of a secondary color (see (3) and (4)). Regarding Y and K, the intervals between the screen vectors are wide, and thereby their tendency to generate moiré is low (see (2)). On the contrary, secondary color G (green) of Y and C and secondary color R (red) of Y and M derived from the colors, having closer screen vectors, present low-frequency moiré of 47 lpi, which results in defective image quality (see (1)). Accordingly, when the screens for Y, M, and C are superimposed, the low-frequency moiré also emerges (see (5)).

Regarding the above-described problem, when the reproduction of human skin colors is important in printing, a measure such as replacement of spatial frequency spectra between K and M is taken to prevent the secondary color moiré of R from emerging (refer to Chapter 4 in "PostScript Screening" written by Peter Fink, Adobe Press 1992). However, this measure simply interchanges the colors which cause moiré, and does not provide a solution to the underlying problem.

As another prior-art example, an orthogonal screen set obtained by arranging primary spectra of four colors M, C, Y, and K at almost equal intervals on spatial frequencies (in other words, by placing adjacent screen vectors at intervals of approximately 22.5°) is known. FIG. 6 shows basis vectors of the screen set with 2400 dpi and 170 lpi according to the above-described arrangement scheme and FIG. 7 shows spatial frequency spectra corresponding to the screen set depicted in FIG. 6 separately plotted as two groups of primary and secondary spectra. Because the processing resolution of the above example is set at 2400 dpi, completely equal allocation cannot be achieved, although frequencies of moiré between Y-C and between Y-M can be adjusted to 63 lpi and that between M-K and between C-K can be adjusted to 71 lpi. Regarding screens constituting the above screen set, dot pattern examples are shown in FIG. 8A and moiré patterns in superimposed states are shown in FIG. 8B. As can be seen from (1), (2), and (3) of FIG. 8B, noticeable low-frequency moiré does not emerge when two color screens are superimposed.

The moiré between two color screens is not a remarkable problem in the prior-art screen set represented by the basis vectors of FIG. 6. In digital image processing, however, it is impossible to allocate halftone dot patterns at completely equal intervals, which raises a problem that low-frequency moiré emerges due to remainder components of a screen frequency between three colors. Further, the prior-art screen set represented by the basis vectors of FIG. 2 also has a similar problem of the low-frequency moiré which emerges when superimposing three colors. Referring to FIG. 9, the problem of low-frequency moiré will be described below.

Relationships between the screen vectors having M, C, and K components in the screen sets of FIGS. 2 and 6 are plotted in FIG. 9 where (a) corresponds to FIG. 2 and (b) corresponds to FIG. 6. The vector representation on the left side of (a) shows screen vectors of the colors shown in FIG. 3 and the vector representation on the right side shows the same screen vectors with K1 and K2 translated so as to adjoin the tip ends of the vectors representing the screen spectra of M and C. In an analogous fashion, (b) depicts the screen spectra of FIG. 7. As shown in the circled parts of FIG. 9, the screen vector of K is longer than the distance between the tip ends of the two vectors of M and C. That is, in the above prior-art scheme, the screen vectors of the three colors of M, C, and K do not form an closed triangle. When the screen vectors of three colors do not form an closed triangle as described above, by synthesizing screens for the three colors, components of the vectors that lie off the triangles (referred to as remainder components) cause low-frequency moiré in which a rosette pattern repeatedly appears with low-frequency periodicity and slightly changed appearance. FIG. 5 shows an M-C-K rosette pattern corresponding to the screen set of FIG. 2 in (6), and FIG. 8 shows an M-C-K rosette pattern corresponding to the screen set of FIG. 6 in (4) of (b).

Regarding the problem associated with such three color synthesis, Japanese Patent Laid-Open Publication No. Hei 05-257268 (corresponding to U.S. Pat. No. 5,155,599) and Japanese Patent Laid-Open Publication No. 2000-050071 disclose that the low-frequency moiré from the remainder components of the screen vectors among the three colors can be reduced by arranging the screen vectors so as to form a closed triangle formed by three colors. Basis vectors of a screen set according to a scheme described in the patent documents noted above are shown in FIG. 10, while screen vectors of the basis vectors are shown in FIG. 11. The screen set of this example has a resolution of 2400 dpi and approximately 170-190 lpi. According to this scheme, the screen vectors of the three colors of M, C, and K form closed triangles as shown in FIG. 12 and produce no remainder of vector components extended off the triangles. Dot pattern examples of the screen set are shown in FIG. 13A and moiré patterns of the superimposed screens are shown in FIG. 13B. With this scheme, as shown in FIG. 13B, moiré formed by superimposing of the screens is of a high frequency and noticeable low-frequency moiré does not emerge.

Related technologies for color reproduction using orthogonal halftone dot screens are described above. On the other hand, in a technical field of digital halftones, use of a non-orthogonal halftone screen for monochromatic tone reproduction as a technique of implementing flexible halftone dot patterns has been suggested (refer to U.S. Pat. No. 4,185,304 and "An Optimum Algorithm for Halftone Generation for Displays and Hard Copies" by Thomas M. Holladay, Proceedings of the SID, Vol.21/2, 1980, 185-192).

The schemes described in Japanese Patent Laid-Open Publication No. Hei 05-257268 and No. 2000-050071 are specifically targeted at three-color halftone printing, and any attempt to extend the three-color scheme to four-color halftone printing raises a problem regarding placement of the fourth color. Regarding the placement of the fourth-color screen, the above-listed patent documents provide no description. For the placement of the forth color, for example, schemes (i) in which Y and K are allocated to the same screen angle and (ii) in which Y is arranged at a middle screen angle between the screen angles of M and C are used. However, in scheme (i), the halftone patterns of Y and K become exactly the same, which poses remarkable hue change due to registration error of two colors of Y and K. On the other hand, scheme (ii) is equivalent to the scheme of FIG. 2, and thereby suffers from noticeable secondary color moiré of R and G containing color Y.

In U.S. Pat. No. 4,185,304 and in the Holladay reference, halftone design using a non-orthogonal screen for a monochromatic image is merely alluded to, and application of the non-orthogonal screens to a color image is not even suggested anywhere in the above documents. The utilization of the non-orthogonal screen brings about increased flexibility in screen angle design, but also leads to emergence of a secondary spectrum generated by the sum or the difference of two primary spectra at a band close to frequency components of the primary spectra. Accordingly, even screen design with reduced low-frequency moiré between primary spectra cannot completely prevent the emergence of low-frequency moiré due to components of secondary spectra. An effective non-orthogonal screen set has not yet been developed.

SUMMARY OF THE INVENTION

The present invention provides an image forming apparatus for digitally reproducing a color image using a screen set consisting of a halftone screen for each color. In such an image forming apparatus, a halftone screen for a first color and a halftone screen for a second color, in the screen set, satisfy a relationship that first vectors, each being one of two screen vectors in a spatial frequency domain defined by basis vectors in two directions of a halftone dot pattern in each of the halftone screens, are parallel to each other and second vectors, each being the other one of the two screen vectors, are not parallel to each other.

In a preferred aspect of the present invention, the halftone screen for the first color and the halftone screen for the second color further satisfy a relationship that the first vectors are equal in magnitude.

In another preferred aspect of this invention, at least one of the halftone screens for the first and second colors is a non-orthogonal screen.

BRIEF DESCRIPTION OF THE DRAWINGS

FIGS. 8A and 8B shows halftone screens defined by the set of basis vectors of FIG. 6 and superimposed states of the halftone screens;

FIG. 9 is a diagram for explaining a problem in synthesis of three colors in each of the screen sets of FIGS. 2 and 6;

FIGS. 13A and 13B shows halftone screens defined by the set of basis vectors of FIG. 10 and superimposed states of the halftone screens;

DESCRIPTION OF THE PREFERRED EMBODIMENT

A preferred embodiment of the present invention will be described in accordance with the drawings.

Figure 14:
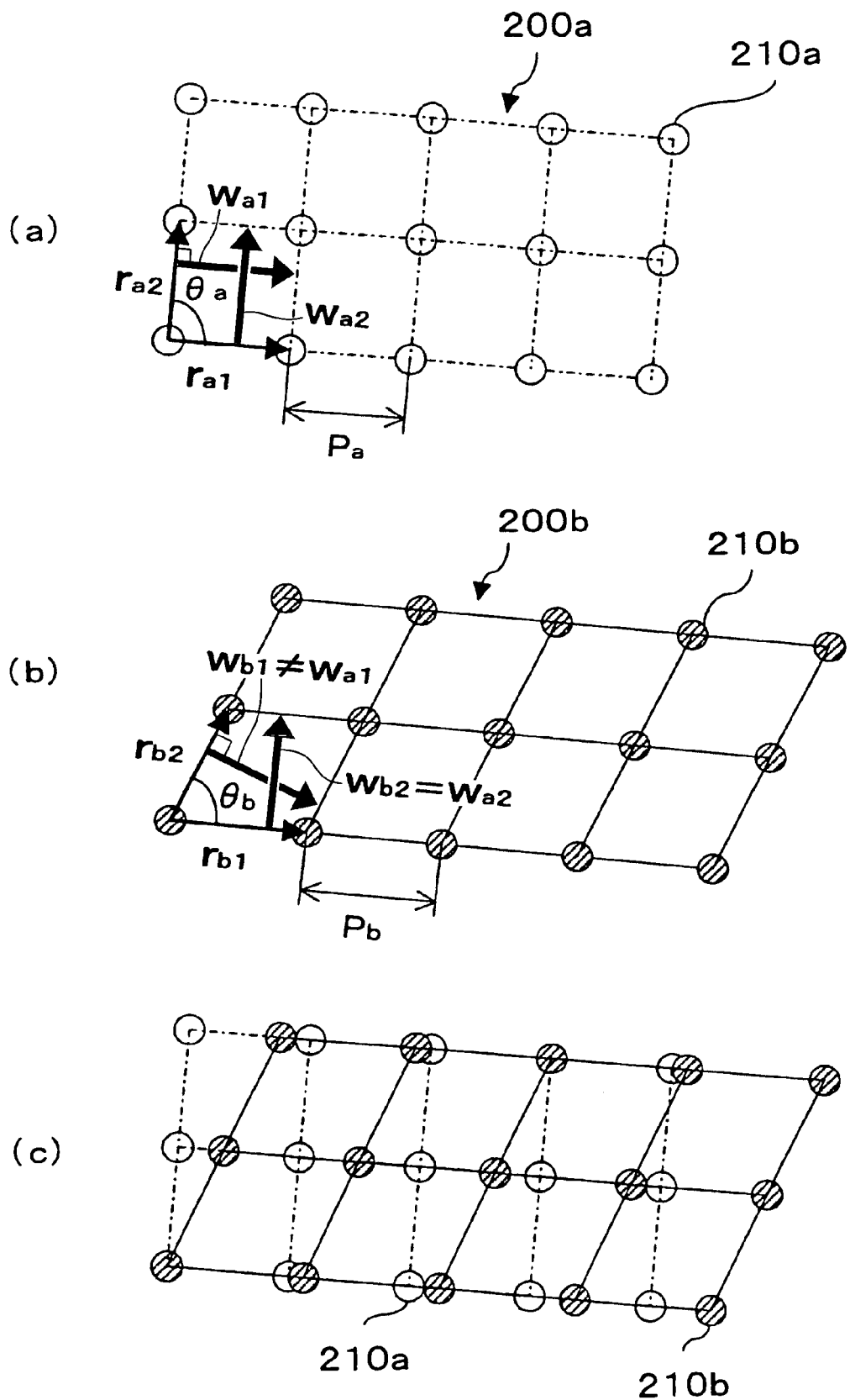
FIG. 14 is a diagram showing a basic concept for a screen set according to an embodiment of the present invention.

Referring first to FIG. 14, a basic concept for a four-color screen set according to the preferred embodiment will be explained.

In accordance with one aspect of the basic concept, at least two halftone screens out of four color halftone screens are arranged so as to satisfy a first relationship that "one screen vector of one of the at least two halftone screens is parallel to one screen vector of the other one of the at least two halftone screens, and the remaining screen vectors of the at least two halftone screens are not parallel to each other." Here, it should be noted that a screen vector is equal to a reciprocal basis vector described in Chapter 4 of "Digital Picture Processing" cited above, and corresponds to a spatial frequency component in a halftone dot pattern of a halftone screen.

A halftone screen $200a$ shown in (a) of FIG. 14 and a halftone screen $200b$ shown in (b) of FIG. 14 both satisfy the above relationship.

The halftone screen $200a$ shown in (a) has an orthogonal halftone dot arrangement in which the pitch between halftone dots $210a$ is Pa. Vectors ra1 and ra2 are basis vectors in two directions of the halftone dot arrangement and connect adjacent dots in either of the two directions in the arrangement. Screen vectors w1, w2 representing spatial frequencies in the halftone dot arrangement are vectors which satisfy the relationship in the following equations relative to basis vectors r1, r2:

$ri \cdot wj=0$ (where $i \neq j$ and $i, j$ is 1 or 2) and $ri \cdot wj=1$ (where $i=j$).

Accordingly, r1 and w2 are perpendicular to each other and satisfy the relationship in the following equation:

$|w2|=1/\{|r1|\sin \theta\}$ (where $\theta$ is an angle between the basis vectors $r1$ and $r2$), and r2 and w1 have a similar relationship. Thus, screen vector wa2 is perpendicular to basis vector ra1 as shown in the figure.

The halftone screen $200b$ shown in (b) has a non-orthogonal halftone dot arrangement. The screen angle of the halftone screen $200b$ is specified so as to make basis vector rb1, which is one of a pair of basis vectors rb1, rb2 in the halftone screen $200b$, parallel to basis vector ra1 in the halftone screen $200a$. By specifying the screen angle as described above, screen vector wb2 perpendicular to basis vector rb1 becomes parallel to screen vector wa2 in the halftone screen $200a$. On the other hand, because basis vector rb2 in the halftone screen $200b$ is not parallel to basis vector ra2 in the halftone screen $200a$, screen vector wb1 is not parallel to screen vector wa1.

Figure 3:
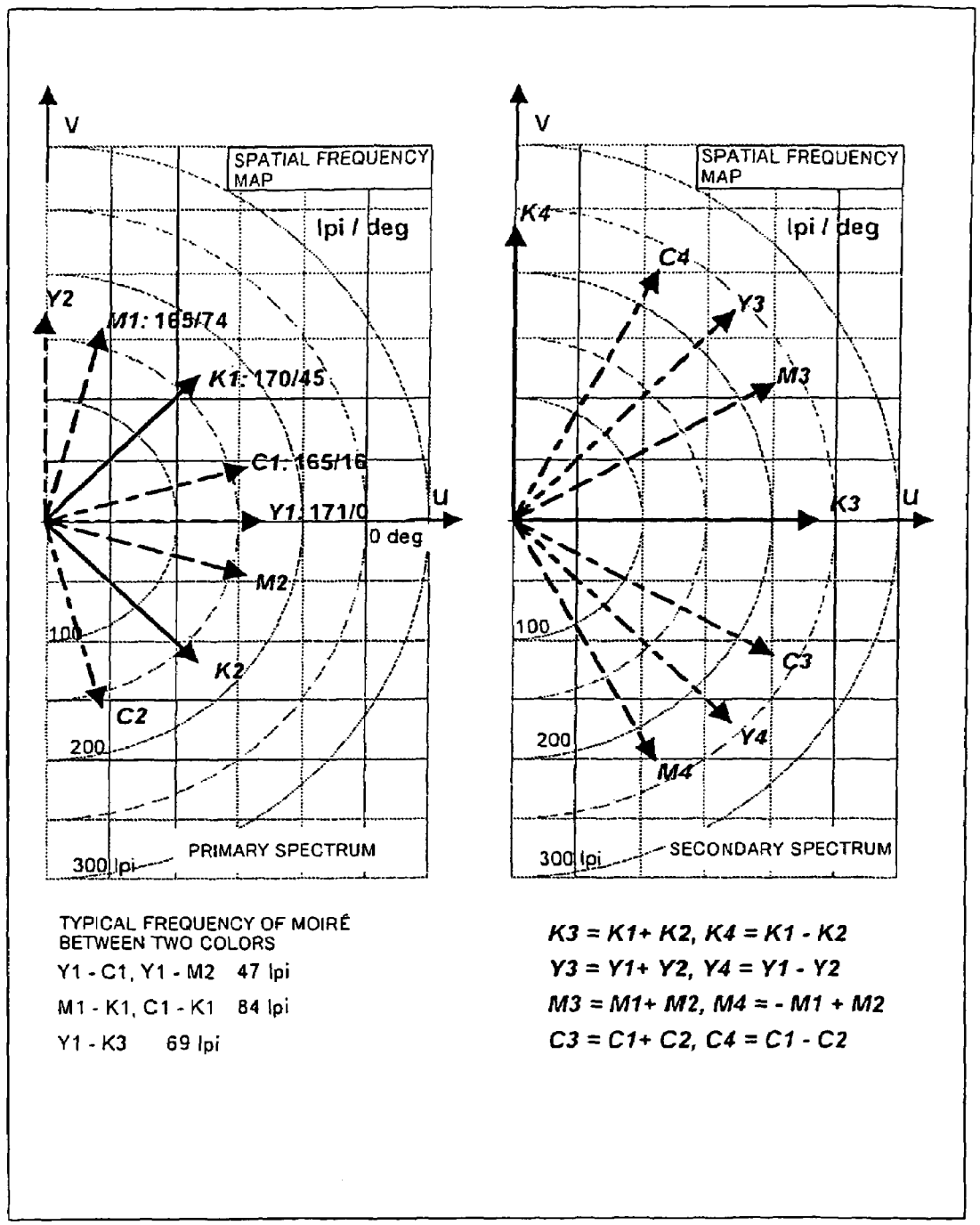
FIG. 3 shows primary spectra and secondary spectra in a spatial frequency domain corresponding to the basis vectors of FIG. 2.
Figure 4:
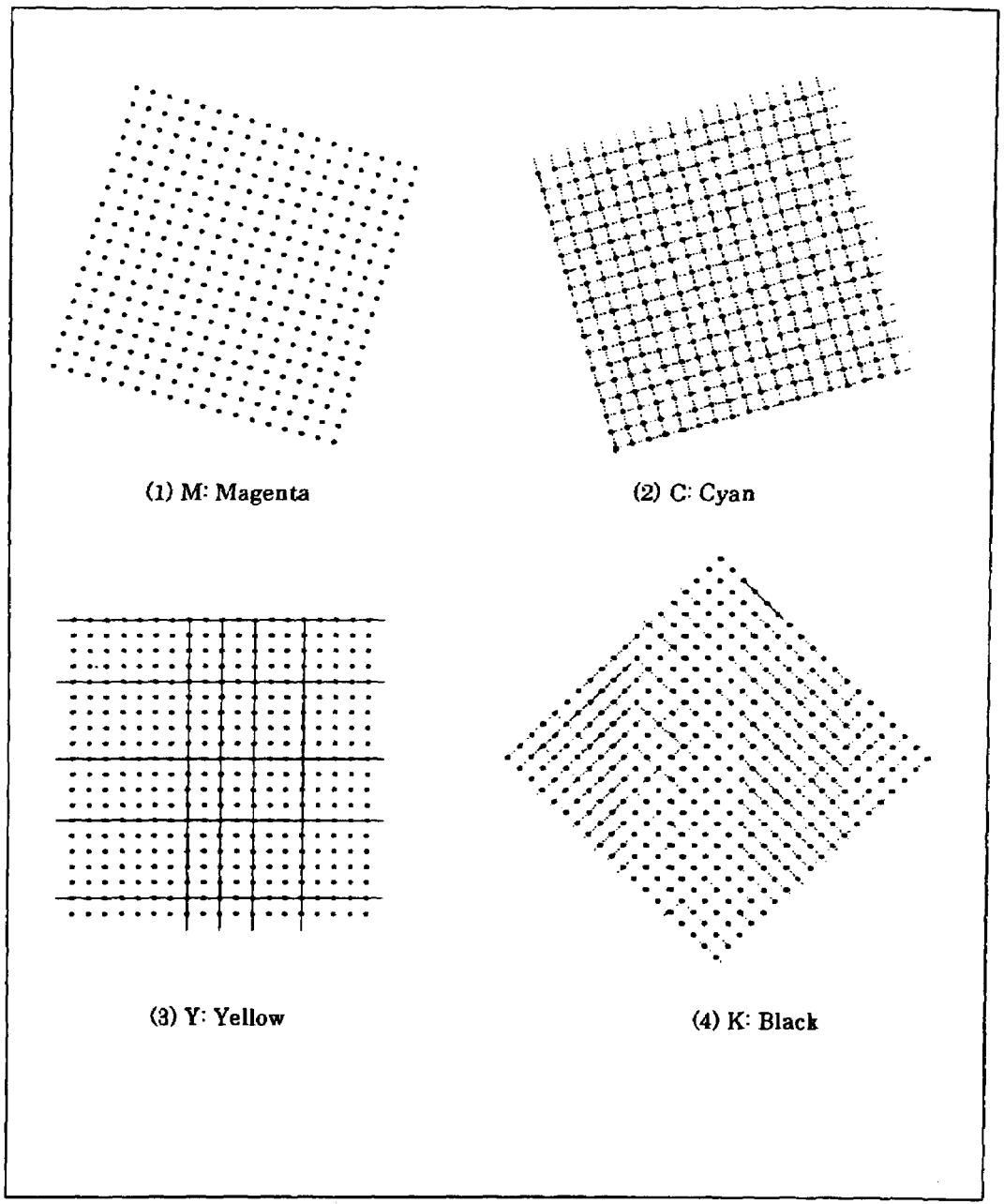
FIG. 4 shows halftone screens for colors of M, C, Y, and K defined by the set of basis vectors of FIG. 2.
Figure 5:
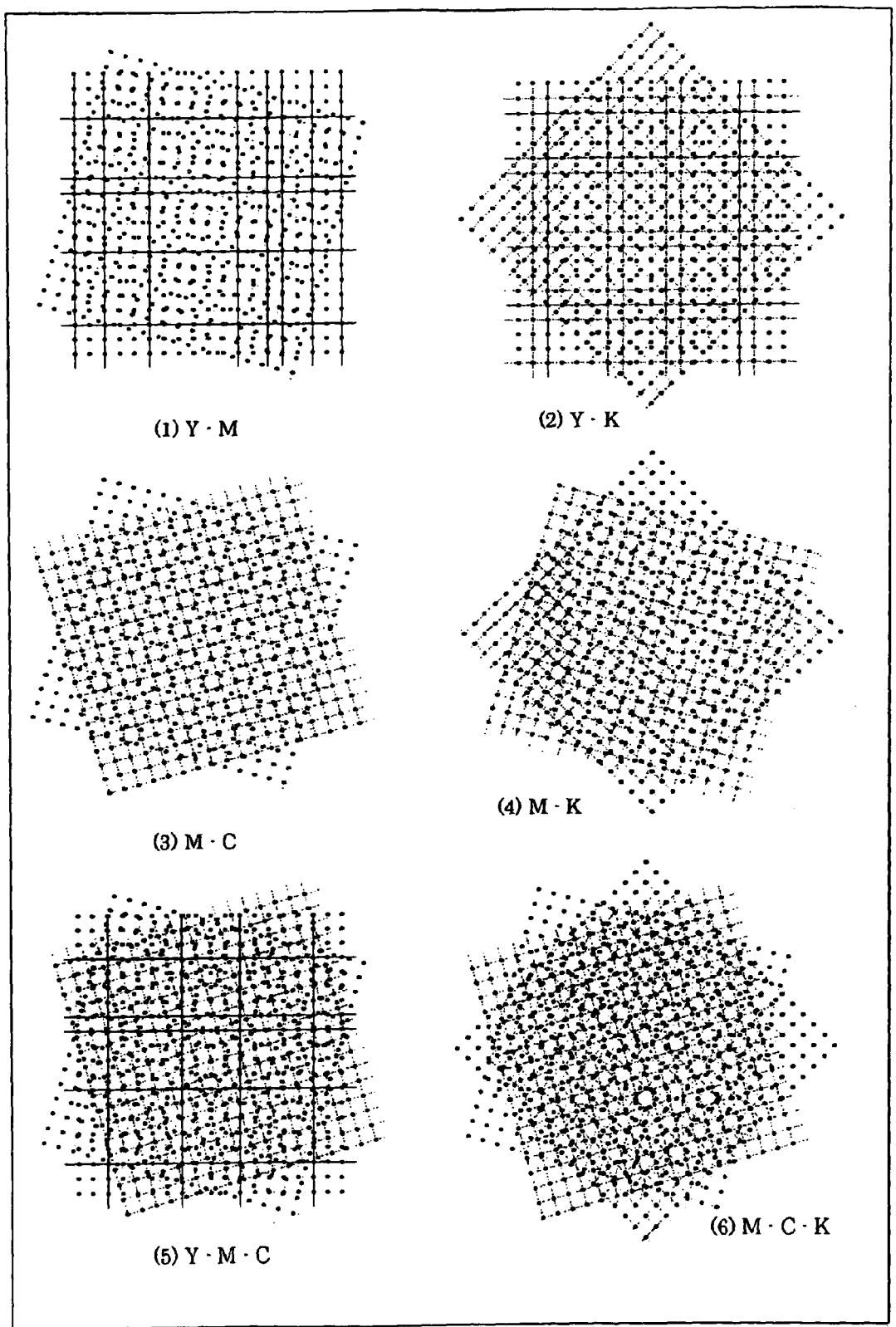
FIG. 5 is a diagram for explaining superimposed halftone screens, each defined by a set of basis vectors of FIG. 2.
Figure 6:
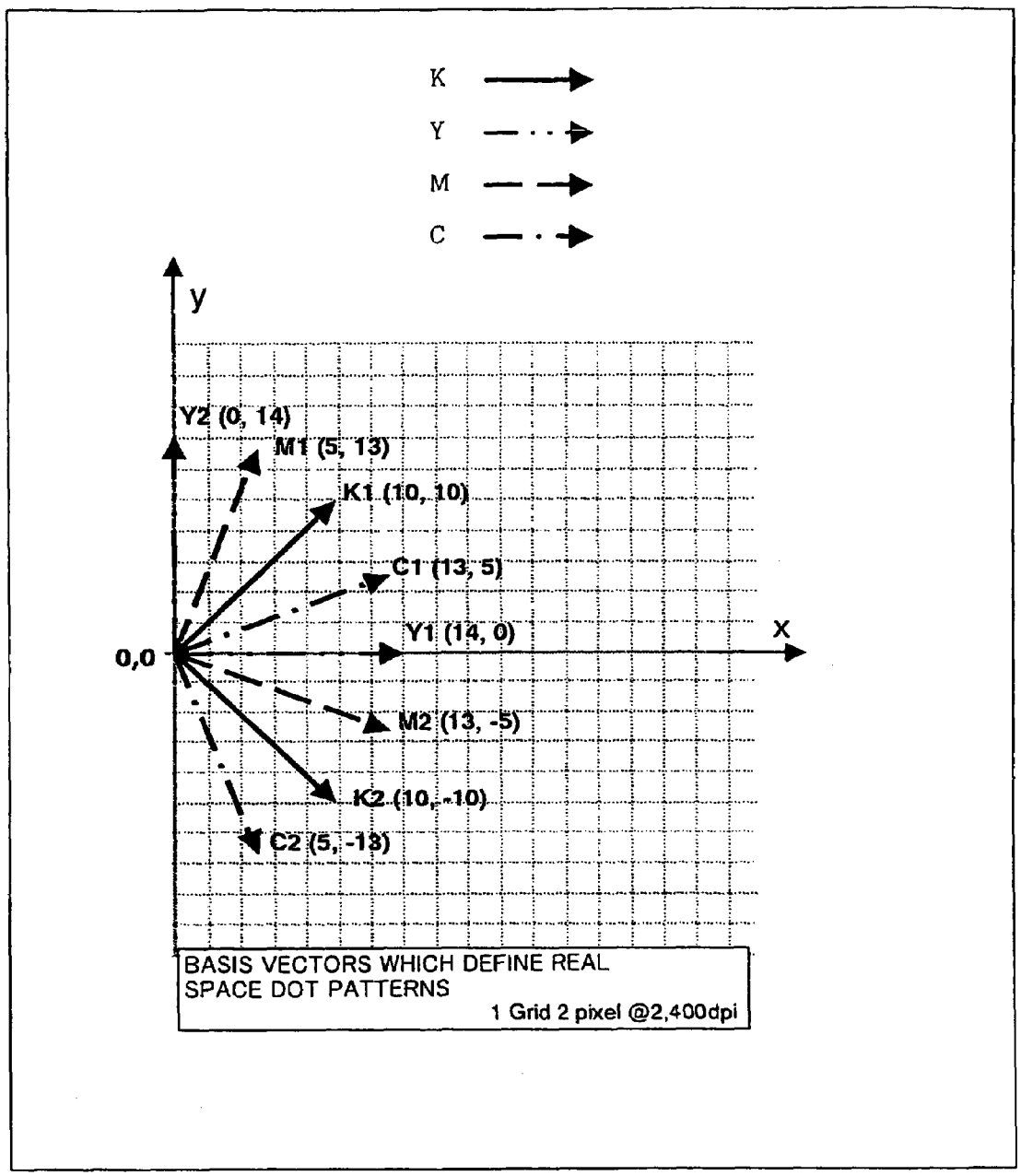
FIG. 6 is another set of basis vectors of the 4-color screen according to a prior art.

By arranging at least two halftone screens out of the four color halftone screens so as to satisfy the above-described relationship, at least two screen vectors out of 8 screen vectors for the four colors can be superimposed in the same direction, which enables angle intervals between the screen vectors other than the superimposed screen vectors to be made wider than the angle intervals as shown in FIGS. 3 and 9. Therefore, in this embodiment, intervals between spatial frequency spectra of halftone screens for four colors can be extended relative to those of prior art four-color screen sets.

It is a second concept underlying this embodiment that the two halftone screens satisfying the first relationship further satisfy a second relationship that the parallel screen vectors are equal in magnitude. That is, regarding the two halftone screens, one screen vector of one of the screens matches one screen vector of the other screen, and the remaining other screen vectors of the screens do not match each other (are nonparallel).

The halftone screens 200a and 200b in FIG. 14 also satisfy the second relationship. More specifically, screen vector wa2 is equal to screen vector wb2. In this case, from definition of the screen vectors, the following equations:

$$|wa2|=1/\{|ra2|\sin \theta a\}=1/|ra2| \; (\theta a=90°)$$

$$|wb2|=1/\{|rb2|\sin \theta b\}$$

can be obtained, and, because the relationship |wa2|=|wb2| holds true, an equation |ra2|=|rb2|sin θb can be obtained. The equation denotes that rows of halftone dots in a direction parallel to basis vectors ra1=rb1 are uniformly spaced in a direction of basis vector ra2. That is, when screen vector wa2 is equal to wb2, by superimposing the two halftone screens 200a and 200b, a superimposed state of the halftone screens shown in (c) of FIG. 14 is obtained.

By arranging the two color halftone screens 200a and 200b so as to satisfy the first and second relationships described above, a relationship that one spatial frequency spectrum out of two spatial frequency spectra of the halftone screen 200a matches one spatial frequency spectrum out of two spatial frequency spectra of the halftone screen 200b, and the remaining other spatial frequency spectra of the halftone screens 200a and 200b do not match each other is also satisfied. By satisfying such a relationship, the number of different spatial frequency spectra in the primary frequency band of the screen set can be reduced compared to prior art configurations, which in turn means that intervals (frequency differences) of the spatial frequency spectra between colors can be extended as compared to prior results. If the frequency differences of the spatial frequency spectra between two colors are increased, a frequency of moiré emerging when superimposing two color screens could become higher to thereby lower visibility of the moiré.

A third concept of this embodiment is as follows. Two halftone screens, which satisfy the first and second relationships, have different halftone dot pitches on the rows of halftone dots in the same direction. The example depicted in FIG. 14 also satisfies this requirement. In other words, a halftone dot pitch Pa in the direction of vector ra1 in the halftone screen 200a is not equal to a halftone dot pitch Pb in the direction of the vector rb1 (=ra1) in the halftone screen 200b.

By making the screen vectors coincide with each other in the two halftone screens, the rows of halftone dots in one direction of two dimensional matrix run parallel to each other at the same interval as shown in (c) of FIG. 14. In such a case, when the rows of halftone dots in the two halftone screens coincide with each other, hue change due to registration error becomes remarkable. On the contrary, by allocating different halftone dot pitches on the rows of halftone dots in the same direction to the two halftone screen screens as described in the third point, hue change due to registration error can be suppressed.

Referring to FIGS. 15-19, a first example of a specific halftone screen set according to the above-described concepts of the present embodiment will be described below.

Figure 15:
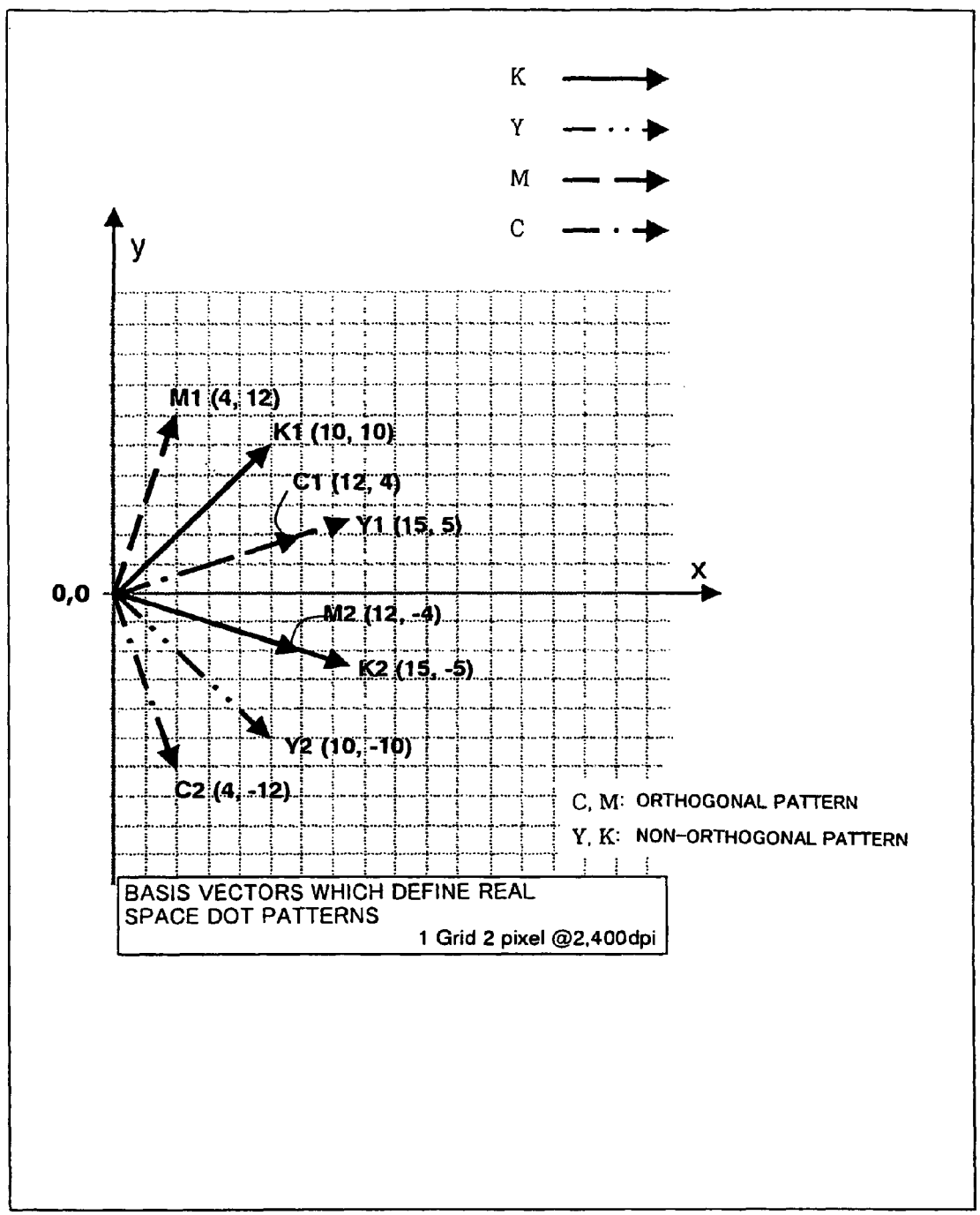
FIG. 15 shows a set of basis vectors in a first example screen set embodying the basic concept of the present invention.
Figure 16:
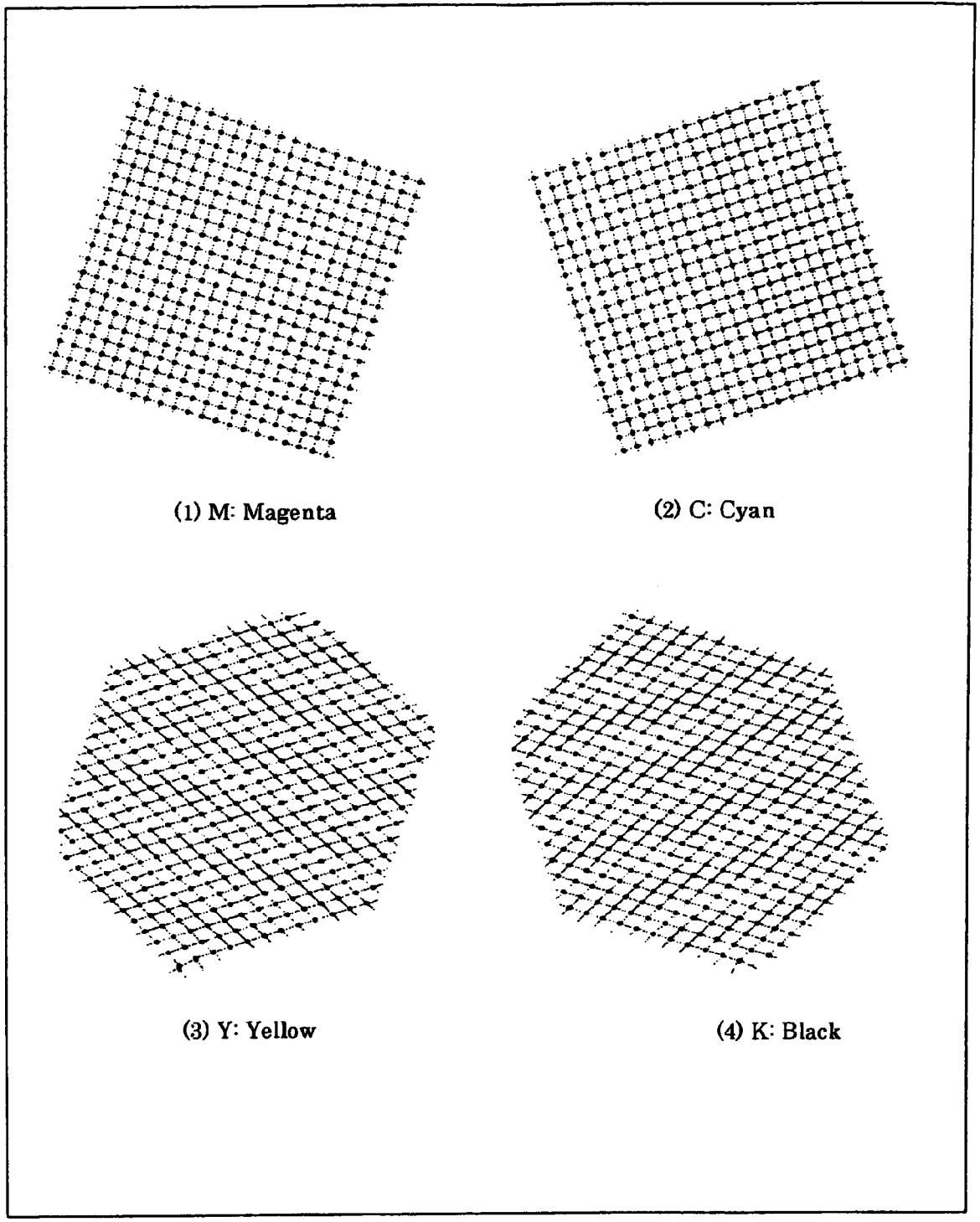
FIG. 16 shows halftone dot patterns of screens for colors M, C, Y, and K constituting the screen set of the first example screen set.

FIG. 15 is a map showing basis vectors of each halftone screen in the halftone screen set. In this map, each pair of two basis vectors M1 and M2, C1 and C2, Y1 and Y2, and K1 and K2 for the colors M, C, Y, and K is plotted so as to start from the origin (0,0). The screen set of the first example is a four-color screen set having a resolution of 2400 dpi and a primary frequency band of 170-190 lpi.

A primary frequency band refers to the frequency range from the minimum frequency to the maximum frequency among the spatial frequency spectra corresponding to basis vectors (a four-color screen set having two special frequency spectra for each color, thereby having a total of eight spatial frequency spectra). The frequency band can be represented in units of lpi. The primary frequency band constitutes a predominant frequency component in a color image to be reproduced. Hereinafter, a spatial frequency spectrum corresponding to the basis vector is referred to as a primary spectrum. On a spatial frequency map (refer to FIG. 17 and other figures), a vector connecting between the origin and a point represented by a primary spectrum is the above-described screen vector. It should be noted that the spatial frequency spectra in a halftone structure have secondary spectra each represented by a vector of the sum or difference of the screen vectors for the same color.

In the map shown in FIG. 15, a single grid square corresponds to 2 pixels, and each coordinate of a point represents a coordinate value taking the width of the single square as 1. As can be seen from the relationship of a set of basis vectors, in this screen set, the halftone screens for Y and K are non-orthogonal screens and the halftone screens for M and C are orthogonal screens. Further, basis vector C1 for a C screen is parallel to basis vector Y1 for a Y screen, and basis vector M2 for an M screen is parallel to basis vector K2 for a K screen. Halftone patterns of the screens for colors M, C, Y, and K constituting this screen set are shown in (1)-(4) of FIG. 16.

Figure 17:
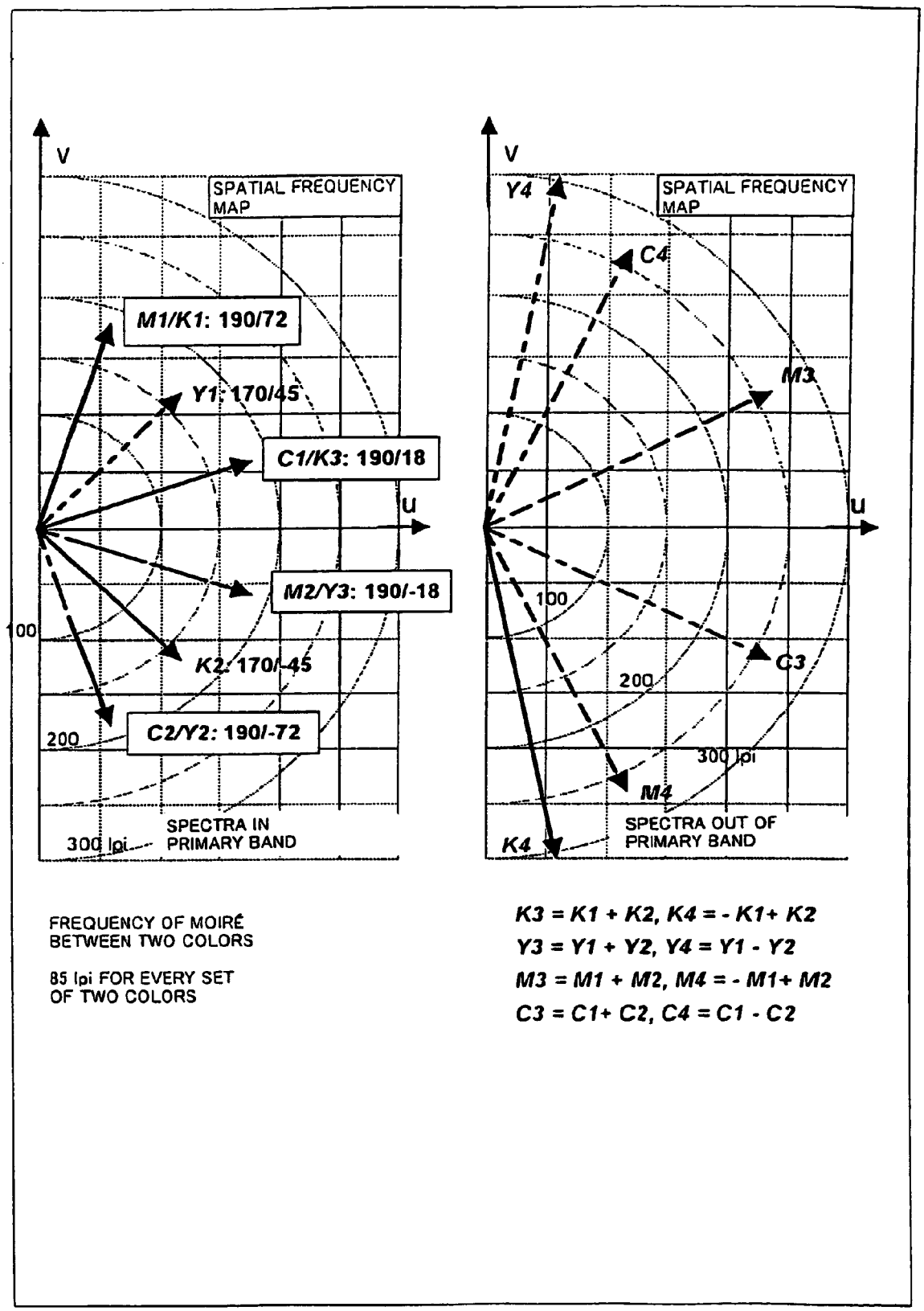
FIG. 17 is a diagram showing a map of spatial frequency spectra in halftone dot structure for the colors in the screen set of the first example.

FIG. 17 shows maps of each spatial frequency spectrum in the halftone dot structure for the colors constituting the screen set defined by the set of the basis vectors of FIG. 15. Among the two maps of FIG. 17, the left map indicates spatial frequency spectra within the primary frequency band, and the right map indicates spatial frequency spectra out of the primary frequency band. In this figure, M1, M2, C1, C2, Y1, Y2, K1, or K2 denotes a screen vector for each color, and the coordinates of each end of the screen vectors represent primary spectra in the screen set. Further, vector M3 is the sum of screen vectors M1 and M2, and vector M4 is the difference between screen vectors M1 and M2. Positive/negative signs of M1 and M2 are assigned for plotting screen vector M4 in the 180-degree area on the right side. Accordingly, when the opposite sign is assigned, the screen vector is reversed by 180 degrees while maintaining the same physical features. The same goes for C, Y, and K. Coordinates of each end of vectors M3, M4, C3, C4, Y3, Y4, K3, and K4 represent secondary spectra in the screen set. For the sake of clarity regarding the correlation between a vector and a spatial frequency spectrum in spatial frequency space (u-v space), the vector and the spatial frequency spectrum corresponding to each other are hereinafter described using the same reference symbol such as referring to a spatial frequency spectrum corresponding to screen vector M1 as "spectrum M1". In FIG. 17, a series of numerals shown next to the reference symbol of a vector are separated by a forward slash into two parts consisting of a left hand part which expresses a spatial frequency of a spectrum represented by the vector placed before the numerals and a right hand part which represents an angle between the vector and the u axis. The spatial frequency is expressed in the unit of lpi. For example, spectrum Y1 has a spatial frequency component with a frequency of 170 lpi and a direction of 45 degrees.

As shown in FIG. 17, spectrum M1 matches spectrum K1, spectrum C1 matches spectrum K3, spectrum M2 matches spectrum Y3, and spectrum C2 matches spectrum Y2 in the screen set of the first example. A commonality relationship of the spectra among four colors is shown in (a) of FIG. 18. In the screen set, six spectra of M3, M4, C3, C4, Y4, and K6 among the secondary spectra are out of the primary frequency band of 170-190 lpi.

Figure 7:
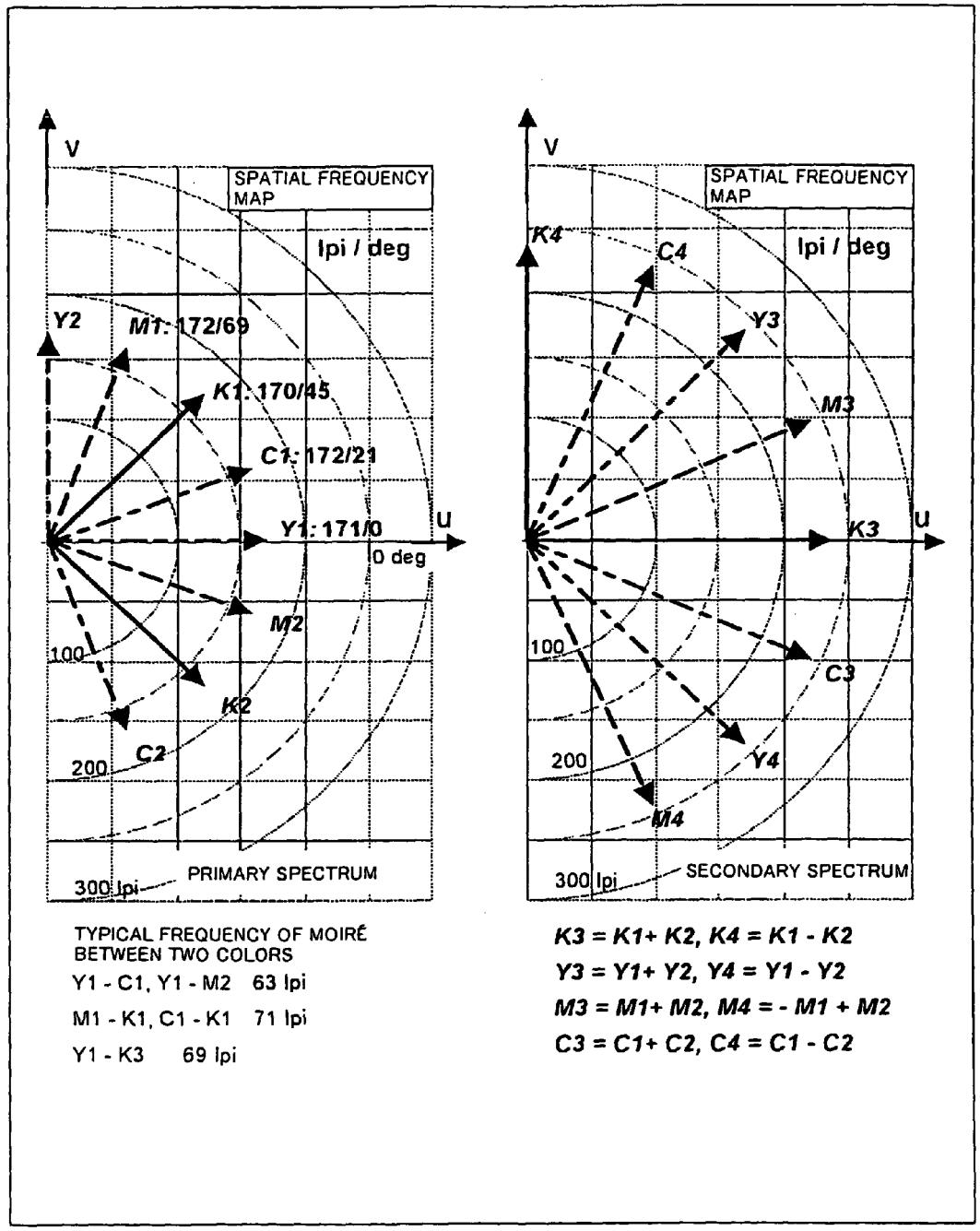
FIG. 7 shows primary spectra and secondary spectra in a spatial frequency domain corresponding to the basis vectors of FIG. 6.
Figure 10:
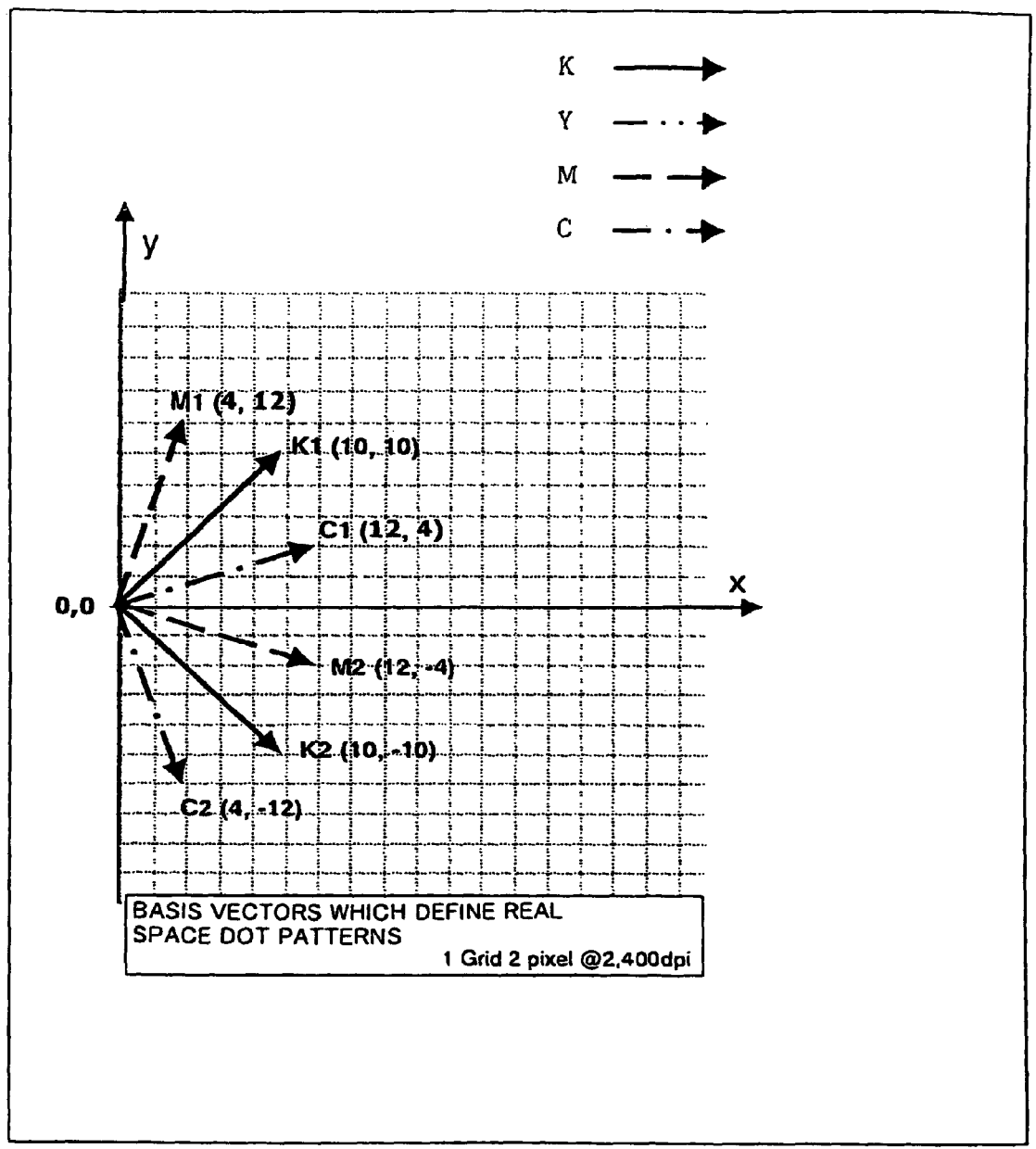
FIG. 10 shows a set of basis vectors of a prior-art 3-color screen set for which a problem of low-frequency moiré at synthesis of three colors is solved.
Figure 11:
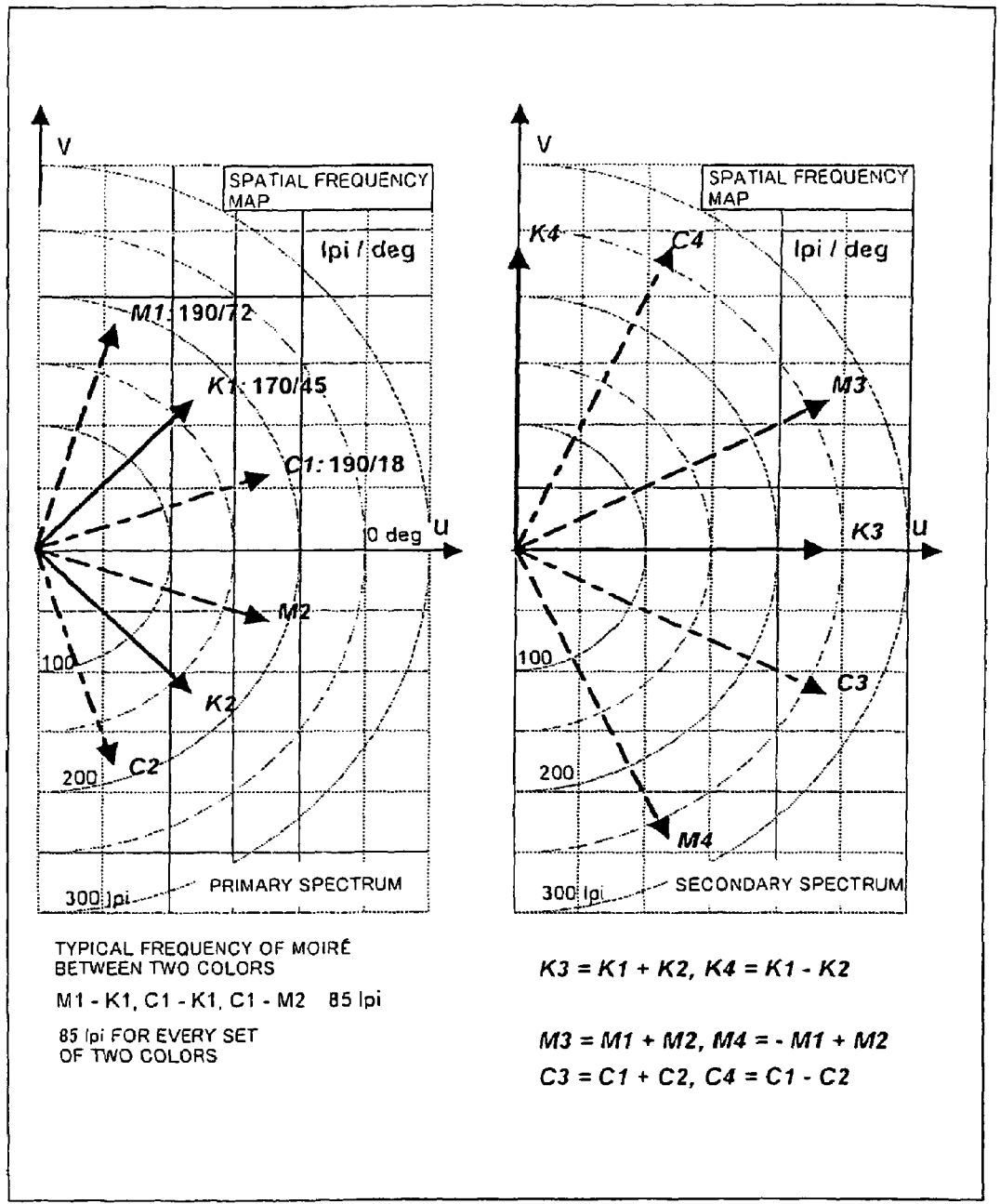
FIG. 11 shows primary spectra and secondary spectra in a spatial frequency domain corresponding to the basis vectors of FIG. 10.
Figure 12:
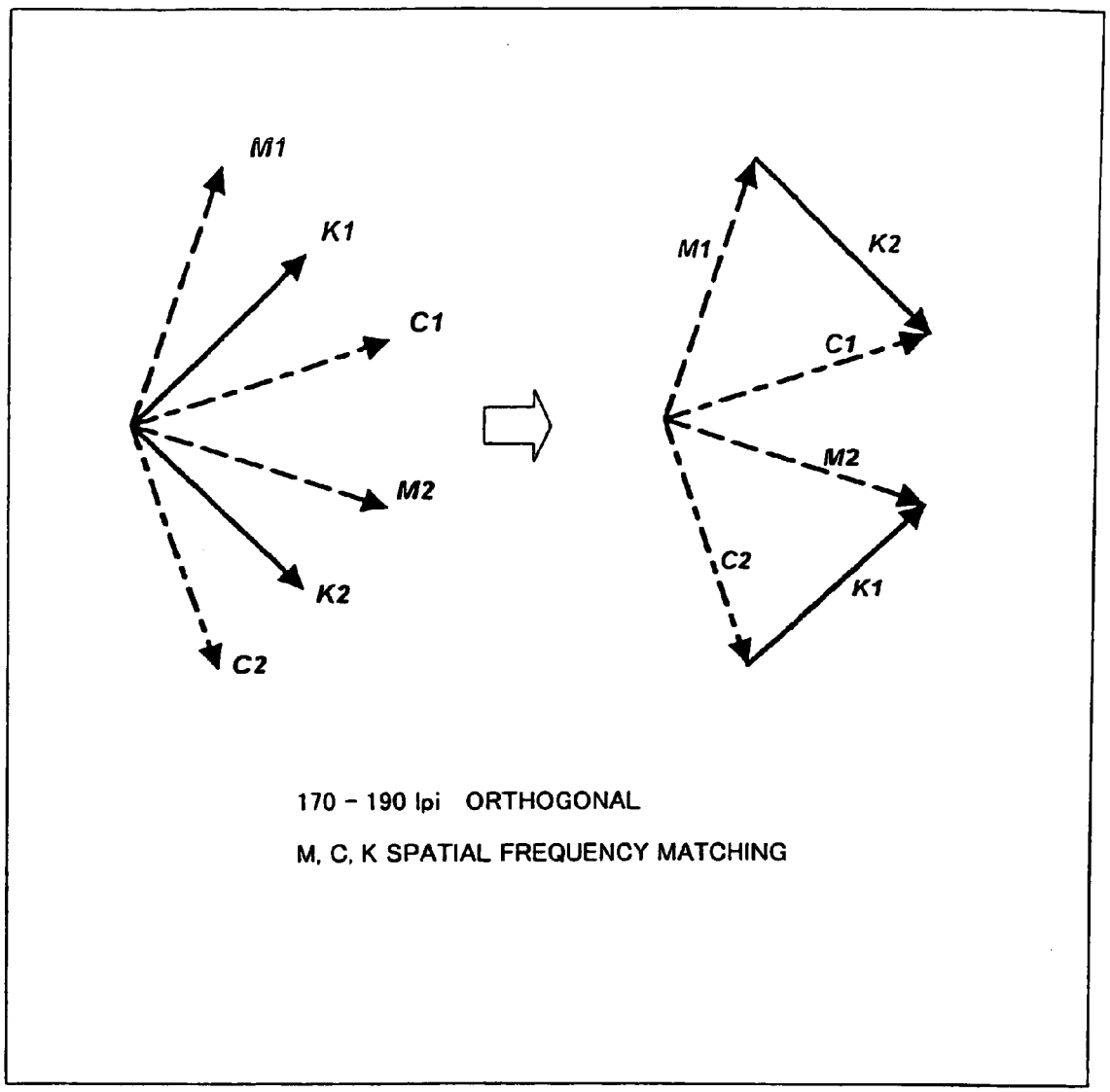
FIG. 12 is a diagram for indicating that screen spectra of the screen set of FIG. 10 form closed triangles.

In this screen set, the primary frequency band contains only 6 different spatial frequency spectra M1 (=K1), Y1, C1 (=K3), M2 (=Y3), K2, and C2 (=Y2), whereas the primary frequency band in the conventional 4-color screen set contains 8 different spatial frequency spectra as shown in FIGS. 3 and 7. Accordingly, in the screen set of the first example, the intervals between the different spatial frequency spectra can be wider in the primary frequency band than in conventional 4-color screen sets, with a result that moiré between two colors, as determined by the distance of the screen vectors between the two colors, is of a higher frequency than in previous 4-color screen sets.

In every combination of two colors selected from four colors in the screen set of the first example, the moiré frequency between two colors is approximately 85 lpi, which is higher than the moiré frequency between two colors emerging in the prior-art screen sets of FIGS. 3 and 7 to which screen ruling is similarly established on the order of 170 lpi. In other words, moiré between two colors in the screen set of the first example is more inconspicuous than that in screen sets known heretofore.

Figure 18:
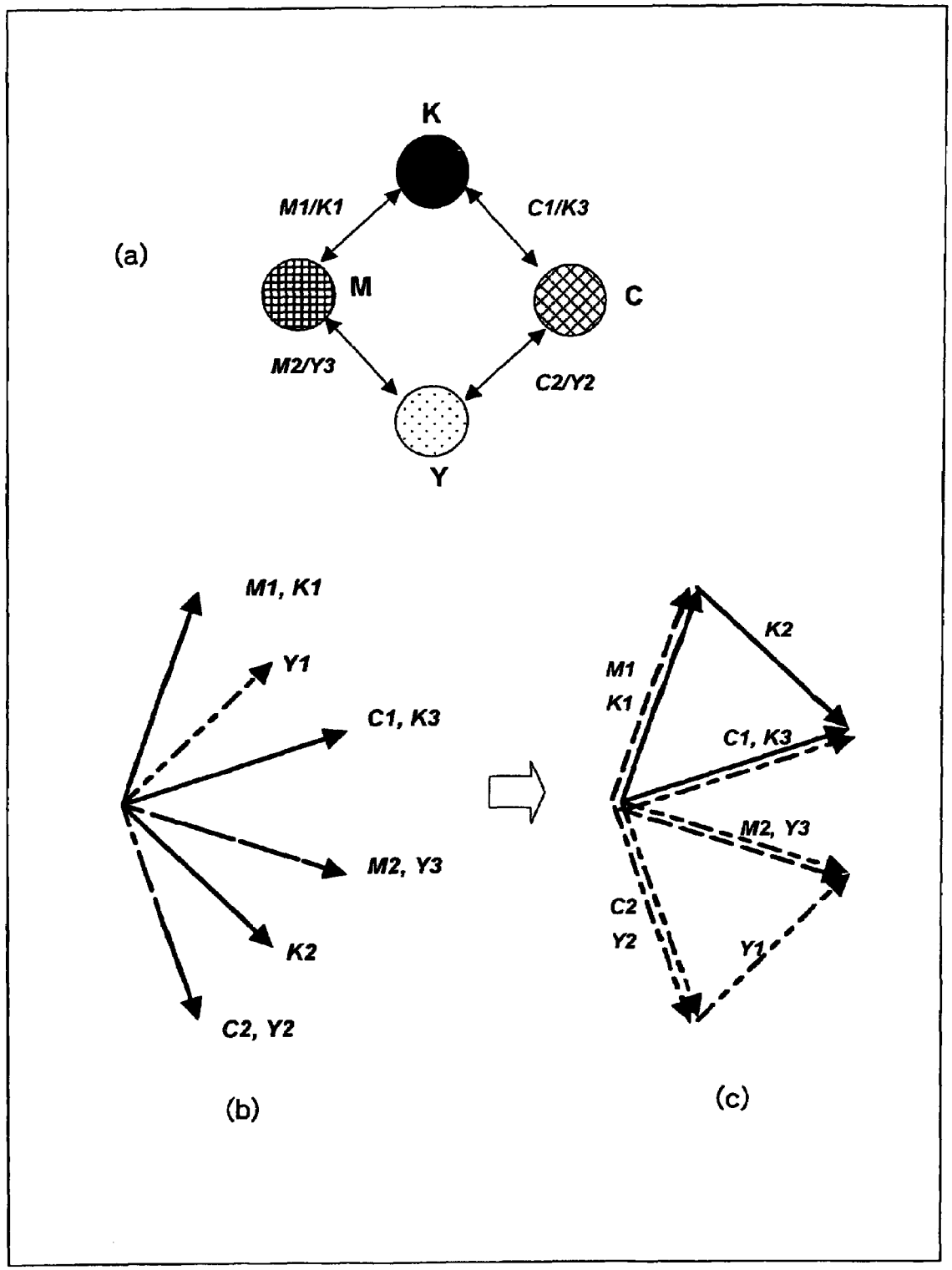
FIG. 18 shows a relationship of commonality between the spatial frequency spectra for the colors in the screen set of the first example and a relationship between screen vectors corresponding to the spatial frequency spectra.

Further, in the screen set of the first example, 8 screen vectors M1, M2, C1, C2, Y1, Y2, K1, and K2 corresponding to the basis spectra form two closed triangles as shown in (c) of FIG. 18. In other words, every screen vector corresponding to one of the basis spectra belongs to either of the two closed triangles. A vector diagram of (c) is drawn by translating vectors K2 and Y1 in the vector diagram of (b) equivalent to the vector diagram of FIG. 17.

By including every screen vector corresponding to the basis spectra into either one of the closed triangles, low-frequency moiré which emerges due to superimposing of three color screens can be suppressed according to principles similar to those applied to the three-color screen set described in the above-cited patent documents Japanese Patent Laid-Open Publication No. Hei 05-257268 and No. 2000-050071. In other words, low-frequency moiré caused by remainder frequency components between three colors in the screen set of the first example can be suppressed with respect to every combination of three colors selected from the four colors to the same extent as the three-color screen set described in the above patent documents.

Figure 19:
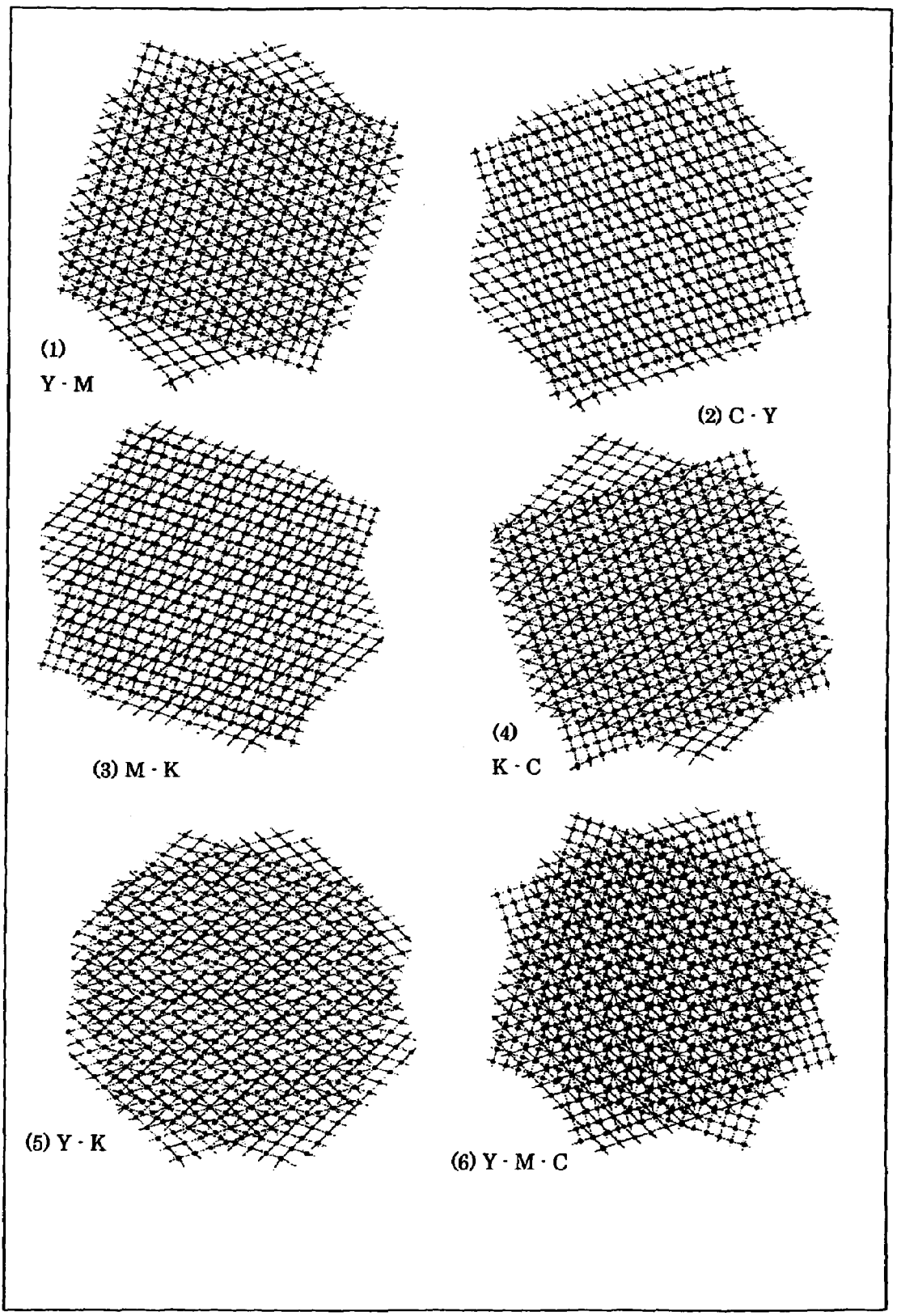
FIG. 19 shows superimposed states of the halftone dot patterns for the colors in the screen set of the first example.

FIG. 19 shows superimposed halftone patterns for the colors constituting the screen set of the first example. As can be seen from the figure, neither remarkable low-frequency moiré nor a rosette pattern emerges when two color screens are superimposed and when three color screens are superimposed.

Because parallel basis vectors M2 and K2, and parallel basis vectors C1 and Y1 differ in length with respect to each other between M and K, and between C and Y in the screen set of the first example, the halftone dot pitch on the rows of halftone dots extending in the same direction differs between M and K, and between C and Y. Hue change due to registration error while superimposing screens for M and K, or for C and Y can be reduced.

Figure 1:
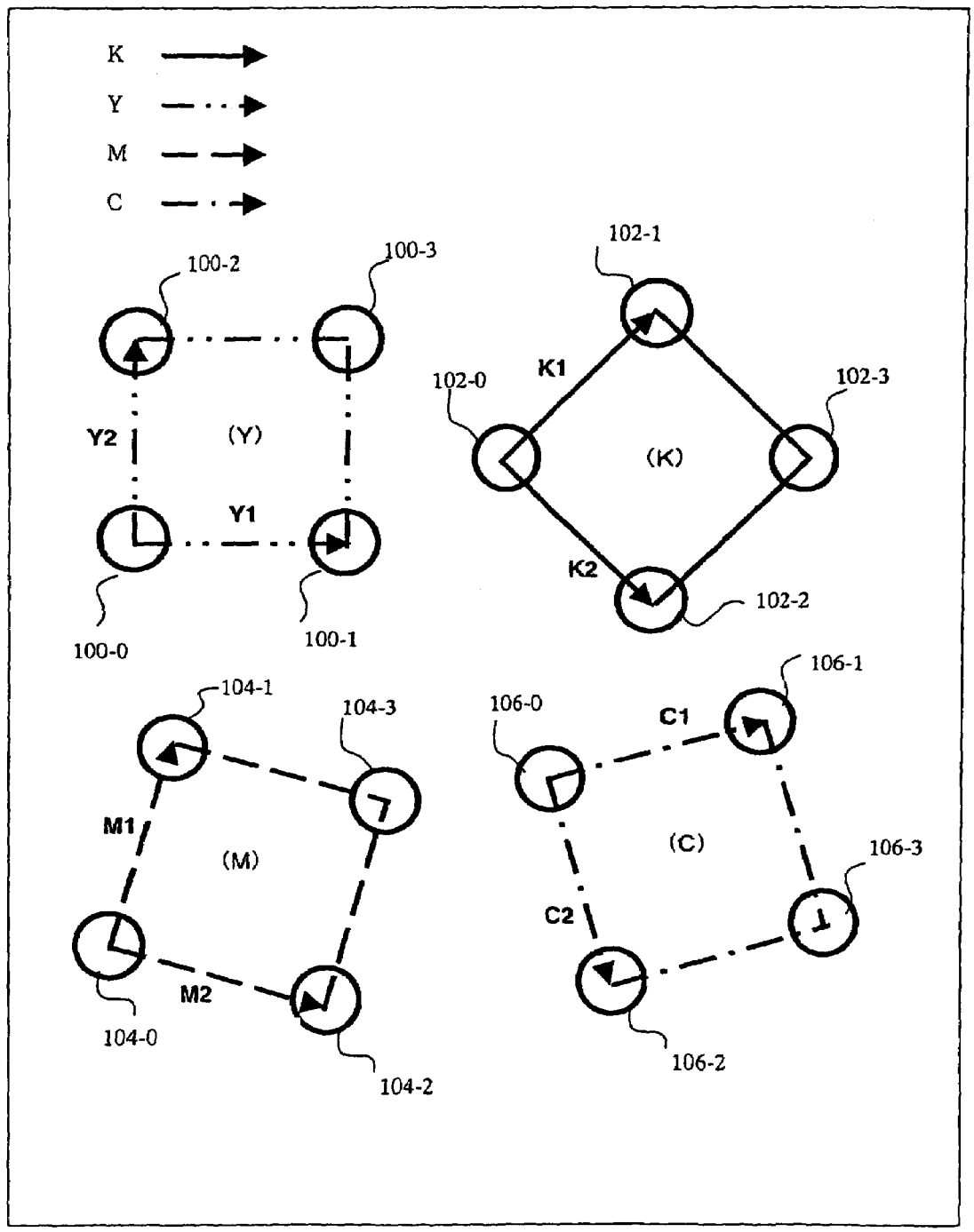
FIG. 1 is a diagram for explaining basis vectors of halftone dot patterns.
Figure 2:
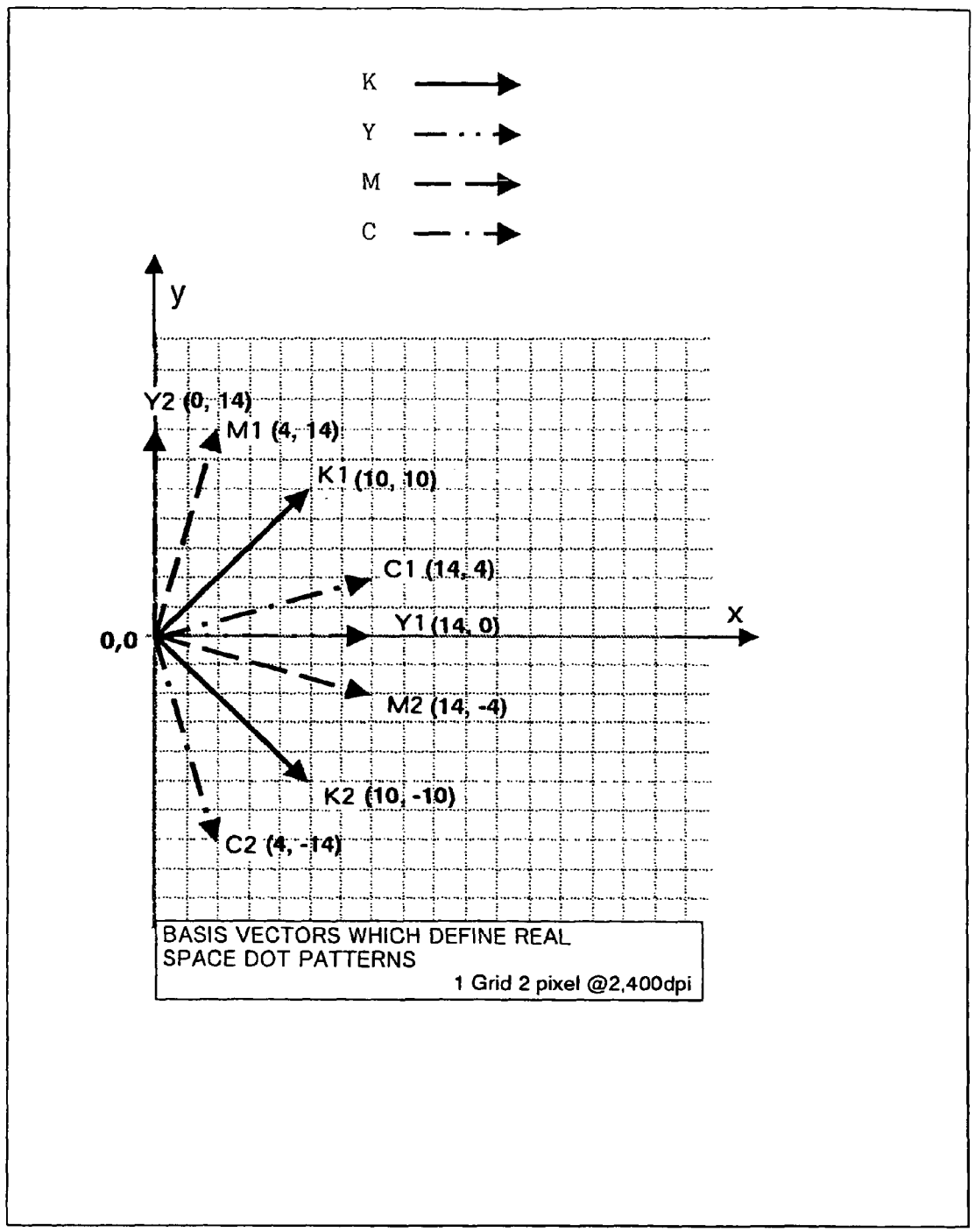
FIG. 2 shows a set of basis vectors of a typical 4-color screen set according to a prior art.
Figure 32:
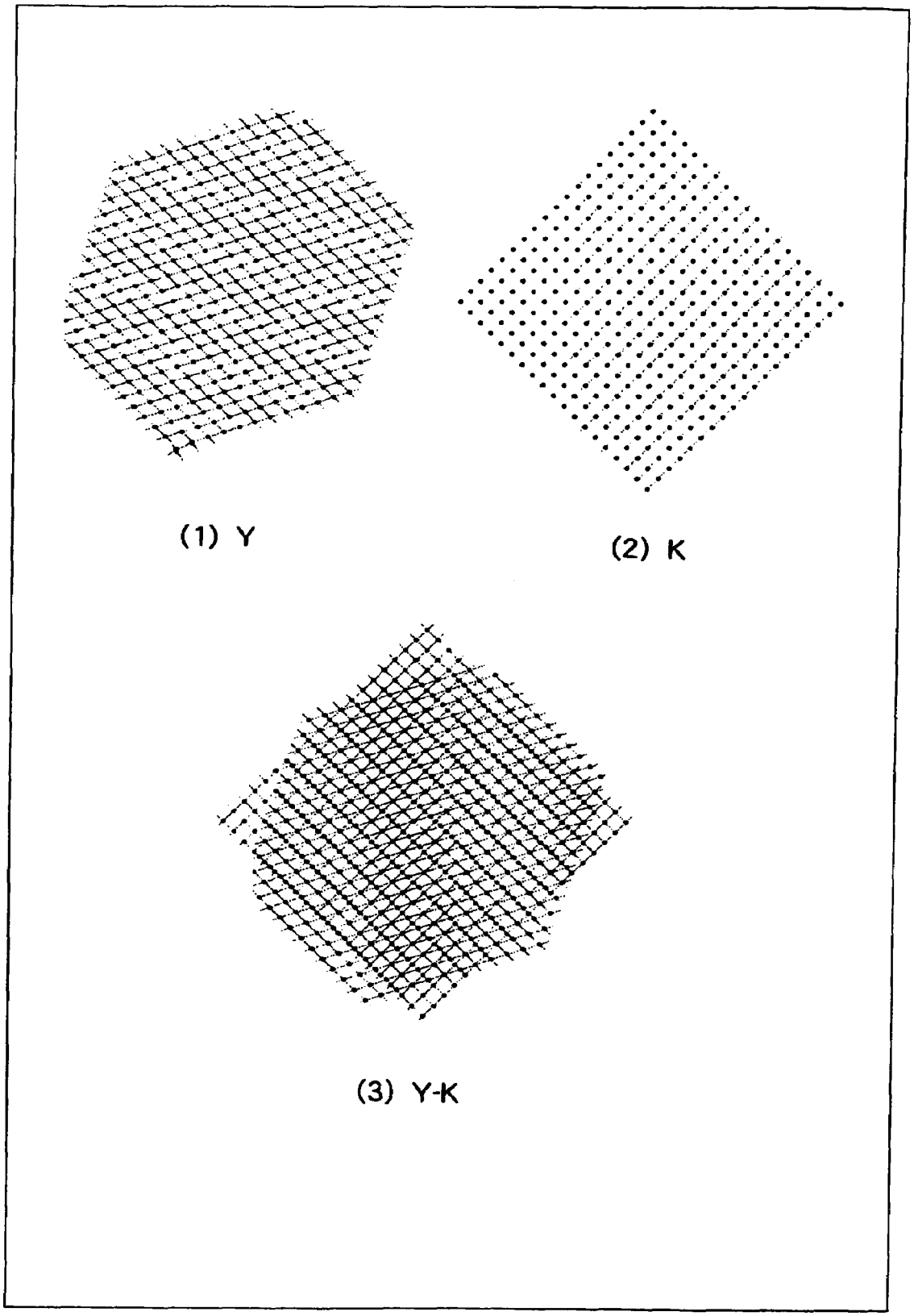
FIG. 32 is a diagram for explaining a problem in superimposing halftone screens having an equal halftone dot pitch on rows of halftone dots extending in the same direction.

On the other hand, when two screens have the same halftone dot pitch on the rows of halftone dots extending in the same direction, the relationship between the two screens becomes as shown in FIG. 32, where (1) depicts a halftone dot pattern for Y (with basis vectors on (10, −10) and (15,5)) in the screen set of the first example, and (2) depicts a halftone dot pattern for K (with basis vectors on (10,−10) and (10,10)) in the prior-art example of FIG. 2. Because the two halftone dot patterns have the same components of 170 lpi and 45 ° for each spatial frequency spectrum, the sharing of a spectrum occurs in the two halftone dot patterns. On the other hand, because the two halftone dot patterns have the same halftone dot pitch on collinear rows, by superimposing the two halftone dot patterns, halftone dots completely coincide between the two screens on alternate lines at −45° as shown in (3), and are completely offset from each other between the two screens on the other alternate lines. In addition to conspicuous visibility, such a screen set brings about an increase in hue change of secondary colors due to positional drifting of halftone dots.

Figure 20A:
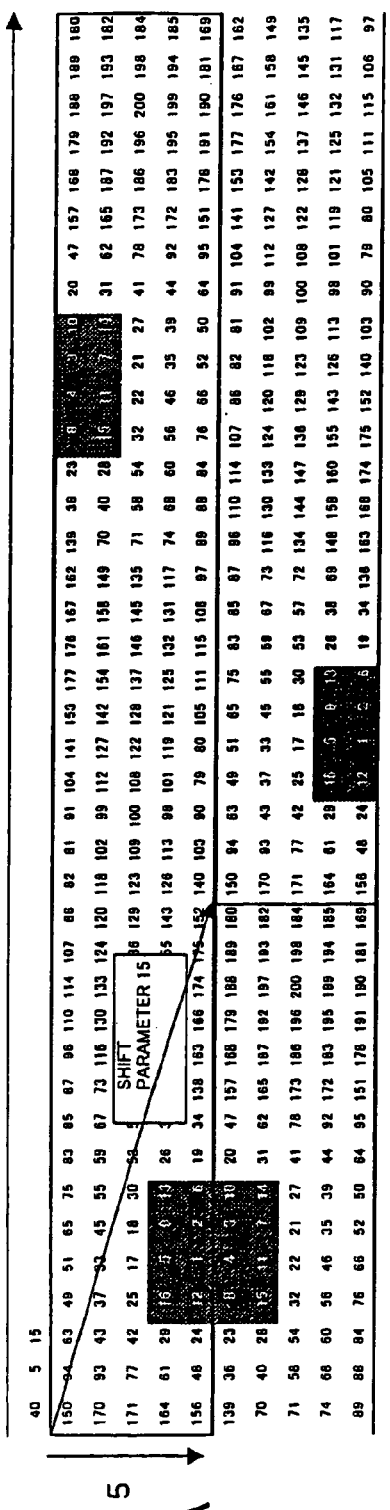
FIGS. 20A and 20B are examples of a threshold value table supporting a screen for color K in the screen set of the first example.

The four-color screen set of the first example can be implemented in a digital image forming system by using a threshold table such as the table shown in FIG. 20A. The threshold table supports the halftone screen for color K in the screen set of the first example.

A threshold table supporting one halftone screen can be formed when basis vectors in two directions of the halftone screen are determined using a well-known technique, such as that described in the above-noted "An Optimum Algorithm for Halftone Generation for Displays and Hard Copies" by Thomas M. Holladay.

Figure 20B:
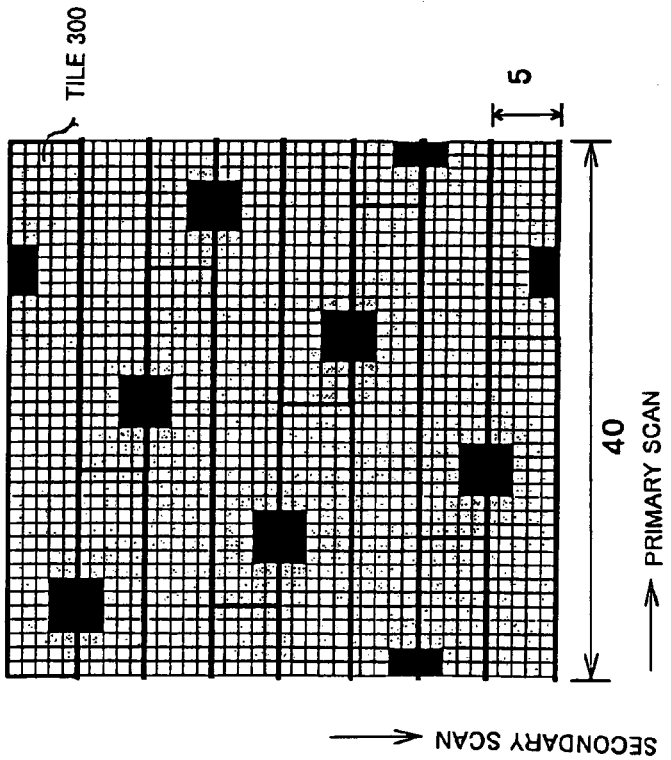

For example, the screen for color K in the screen set of the first example shown in FIG. 15 has basis vectors consisting of a vector extending from the origin (0,0) to (15,−5) and a vector extending from the origin (0,0) to (10,10). A table expressing a repetition of the basis vectors as a repetition of two-dimensional tiles is referred to as "Holladay Tile" or a "circulating matrix of Holladay", and can represent almost every halftone dot pattern, regardless of whether representative of an orthogonal grid system or a non-orthogonal system (refer to the Holladay citation). With the threshold table shown in FIG. 20, the entire area of an image is processed by repeating tiles 300 each comprising 200 (40 by 5) pixels with a shift parameter 15 (i.e. a 15-pixel displacement in a primary scan direction is carried out every displacement of 5-pixel tile height in a secondary scan direction) (refer to FIG. 20B). A threshold value from 1 to 200 is entered into each pixel in the tile of 40×5 pixels, and pixels each having an input image data value greater than the entered threshold value are taken as ON and all other pixels are taken as OFF, which enables modulation of areas of halftone dots according to the input image data. Because pixel groups hatched in FIG. 20A are turned OFF when a value of input image data is 16, FIG. 20B shows a halftone dot pattern obtained as a modulation result when the value of input image data is 16.

As input image data is generally 0-255 (8 bits), actual threshold values are standardized to values of 0-255 here. In a system in which 256 or greater levels of halftone are required, a multi dot method, in which double levels of halftone are represented by synthesizing two halftone dots similarly to the conventional dither matrix method, and other methods may be combined with the above-described technique.

Halftone dot generation using such processing of threshold values can be easily implemented by software. Further, because the halftone dot generation is a simple procedure such that threshold values are compared with input image data while continuously reading the threshold table loaded in a memory to output ON/OFF bits, the halftone dot generation can easily be incorporated into a hardware circuit.

Figure 21:
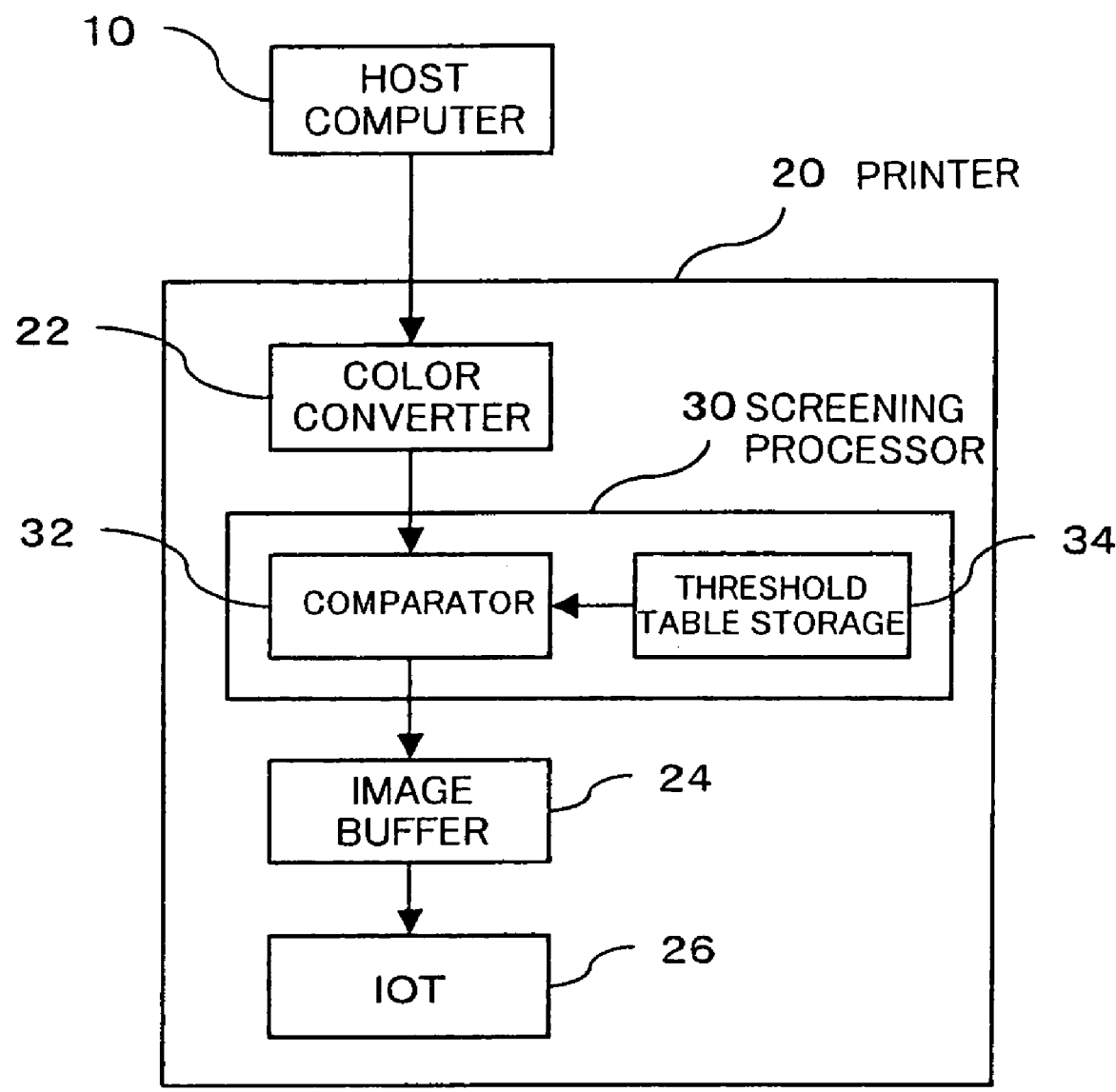
FIG. 21 shows the schematic structure of a printer using a screen set designed according to the present invention.

FIG. 21 shows a schematic structure of a printer 20 in which such halftone dot generation is implemented. In the printer 20, a color converter 22 executes both conversion of input data, input from a host computer 10, into color space representation used in the printer 20, and color compensation for ensuring compatibility with the printer 20. A screening processor 30 converts the image data processed in the color converter 22 into binarized halftone images by a technique employing the above-described threshold table. A threshold table storage 34 stores threshold value tables for colors created from the halftone screens in the first example defined by the set of basis vectors of FIG. 15 using the technique of Holladay. A comparator 32 compares each pixel value stored in the threshold value table with input image data and enters resultant binary data into an image buffer 24. An IOT (Image Output Terminal) sequentially forms every halftone image for each color stored in the image buffer 24 on paper to thereby print a color image on the paper. Although a printer 20 is described above, the screen set according to this invention is equally applicable to other types of image-forming apparatuses, including digital copiers, digital multiple function processing machines, display apparatuses, and the like.

Referring now to FIGS. 22 to 26, a second example of the specific halftone screen set according to the concepts of this embodiment will be described below.

Figure 22:
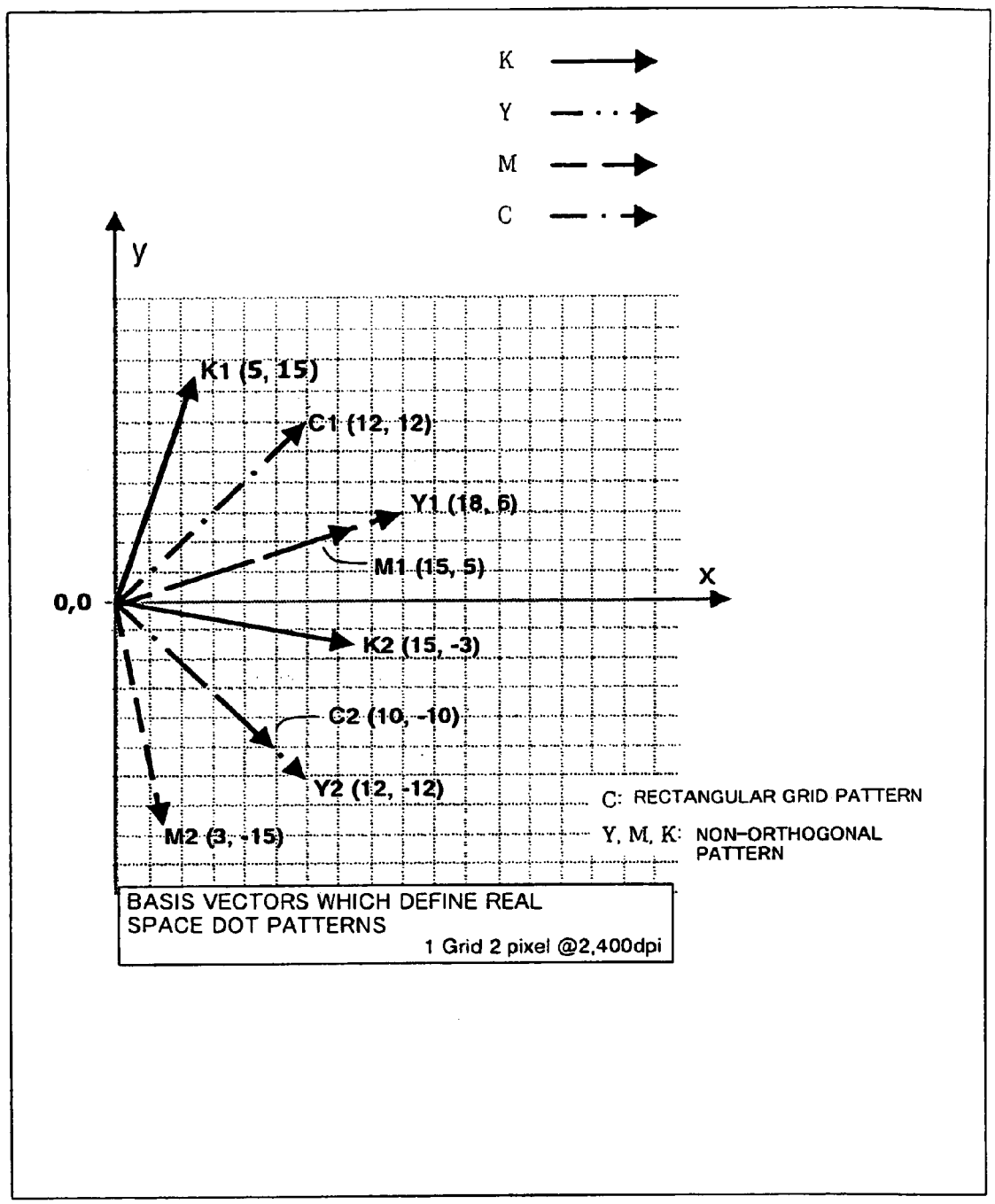
FIG. 22 shows basis vectors of halftone screens in a screen set of a second example.
Figure 23:
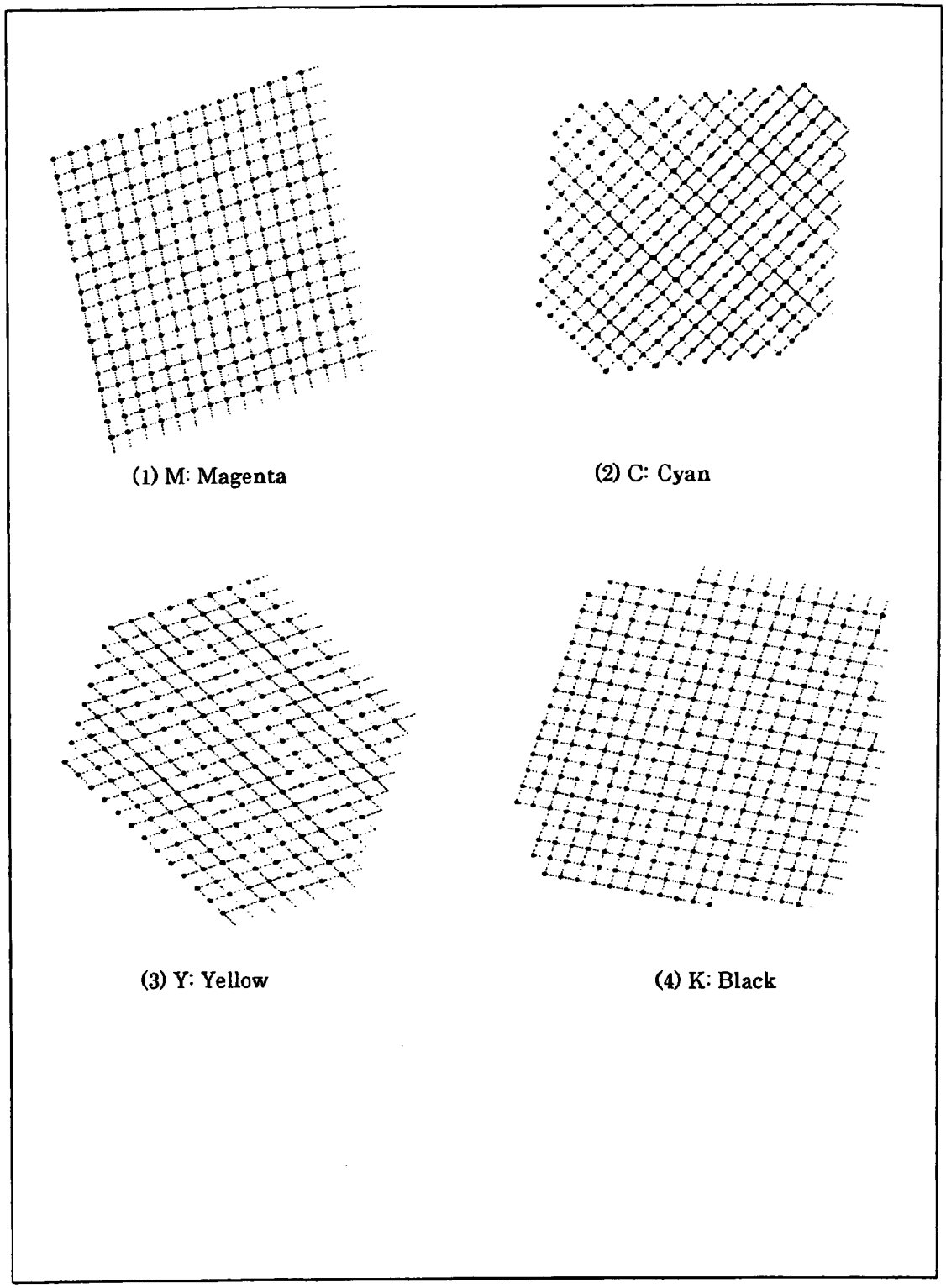
FIG. 23 shows halftone dot patterns of screens for colors M, C, Y, and K constituting the screen set of the second example.

FIG. 22 is a map showing basis vectors of each halftone screen in the halftone screen set. The screen set of this example is a four-color screen set having a resolution of 2400 dpi and a primary frequency band of 141-170 lpi. Each dot pattern of the halftone screens in the screen set is shown in FIG. 23. As can be seen from FIGS. 22 and 23, the screen set consists of a screen for color C having an orthogonal pattern and screens for colors Y, M, and K each having a non-orthogonal pattern. Further, basis vector M1 is parallel to basis vector Y1 and basis vector C2 is parallel to basis vector Y2.

Figure 24:
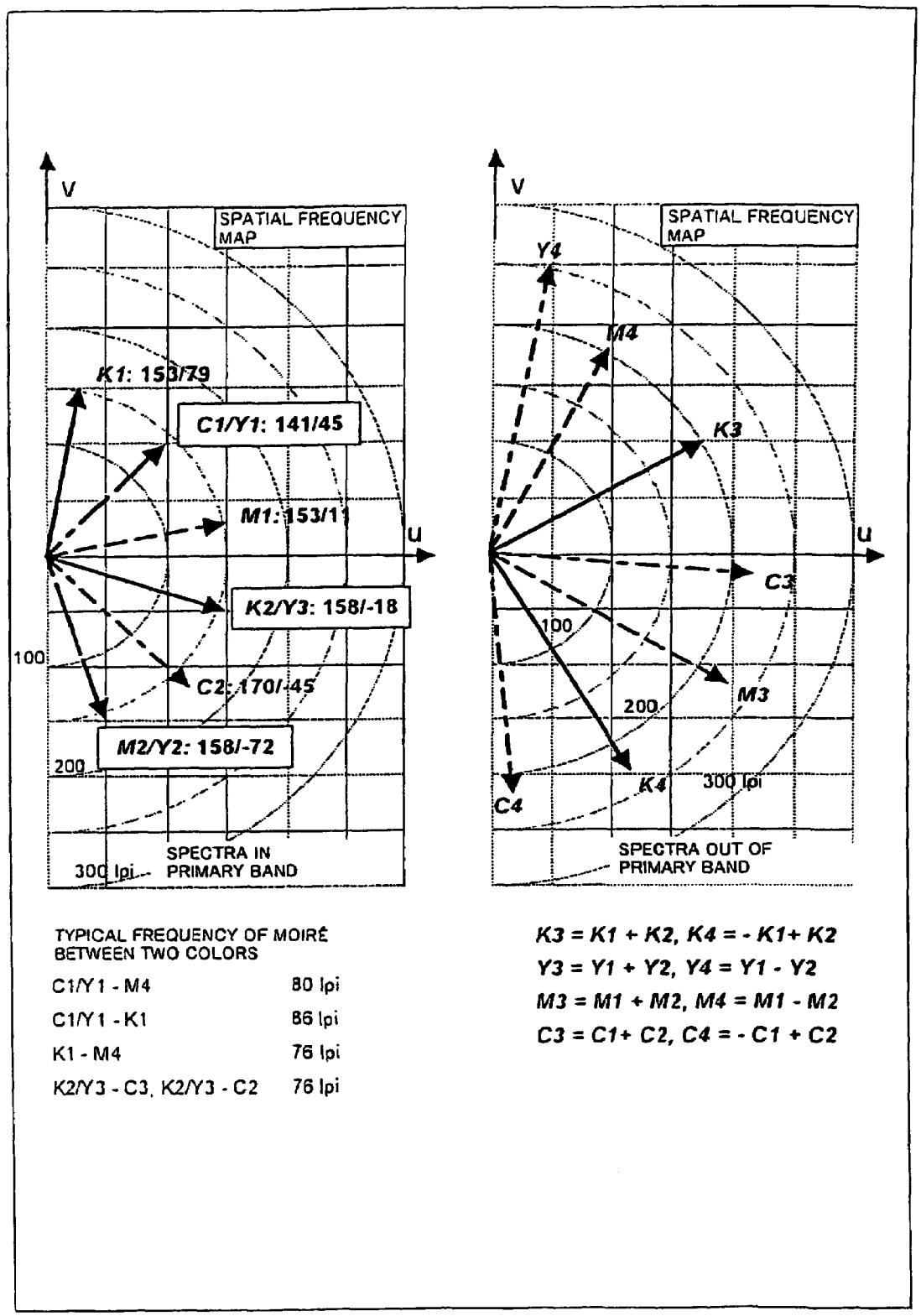
FIG. 24 is a diagram showing a map of spatial frequency spectra in a halftone dot structure for the colors in the screen set of the second example.

A set of spatial frequency spectra in the screen set of the second example has a relationship between the spatial frequency spectra as shown in FIG. 24. As shown in the figure, spectra C1 and Y1 match each other, spectra K2 and Y3 match each other, and spectra M2 and Y2 match each other in the screen set of the second example. A commonality relationship of spectrum among the four colors is shown in (a) of FIG. 25. In the screen set, seven spectra of M3, M4, C3, C4, Y4, K3, and K4 among the secondary spectra are out of the primary frequency band of 141-170 lpi.

In the screen set of the second example, the number of different spatial frequency spectra within the primary frequency band is 6, which is smaller than the 8 of conventional 4-color screen sets. Because, as with the screen set of the first example, the screen set of this example allows the frequency of moiré between two colors to be higher than that in prior-art screen sets, visibility of moiré between two colors can be reduced compared with prior-art screen sets. The frequency of moiré between two colors in the screen set of this example is 76-86 lpi, which is a relatively high frequency where comparison with the primary frequency band is concerned.

In the second example, halftone dot pitch on the rows of halftone dots extending in the same direction differs between M and Y, and between C and Y. Therefore, hue change due to registration error when superimposing the screens for M and Y, or for C and Y can be reduced.

Figure 25:
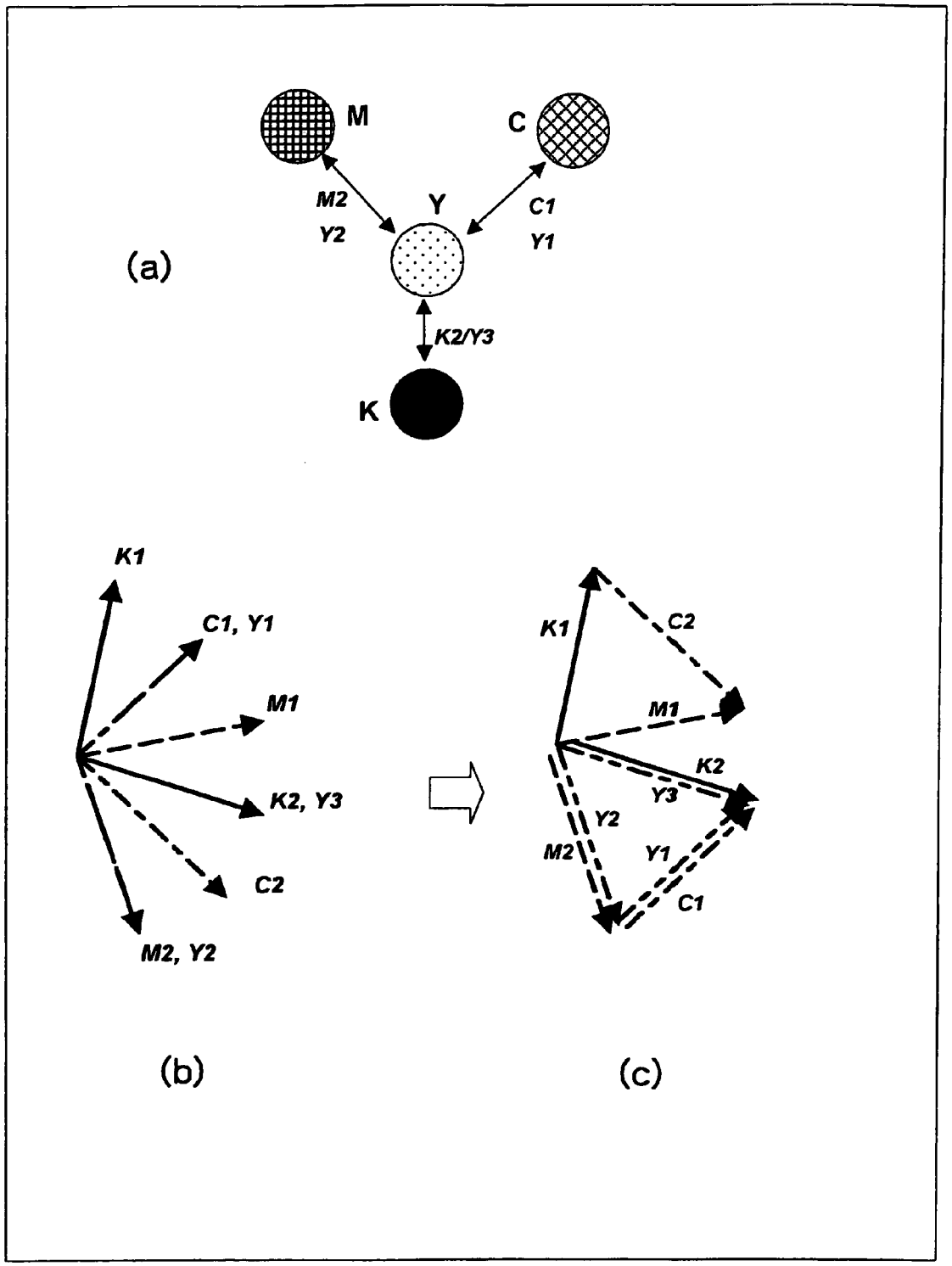
FIG. 25 shows a relationship of commonality between the spatial frequency spectra for the colors in the screen set of the second example and a relationship between screen vectors corresponding to the spatial frequency spectra.

Further, in the screen set of the second example, 8 screen vectors M1, M2, C1, C2, Y1, Y2, K1, and K2 corresponding to the basis vectors form, as with the first example, two closed triangles as shown in (c) of FIG. 25. Among the above screen vectors, screen vectors M2, C1, and K2 lie on the triangle formed by screen vectors Y1, Y2, and Y3. It should be noted that the vector diagram of (c) is drawn by translating vectors C1, Y1, C2 in the vector diagram of (b) identical to FIG. 24. Because every screen vector corresponding to the basis vectors also belongs to one of the closed triangles in the second example, the low-frequency moiré emerging while superimposing the screens for three colors can be suppressed.

Figure 26:
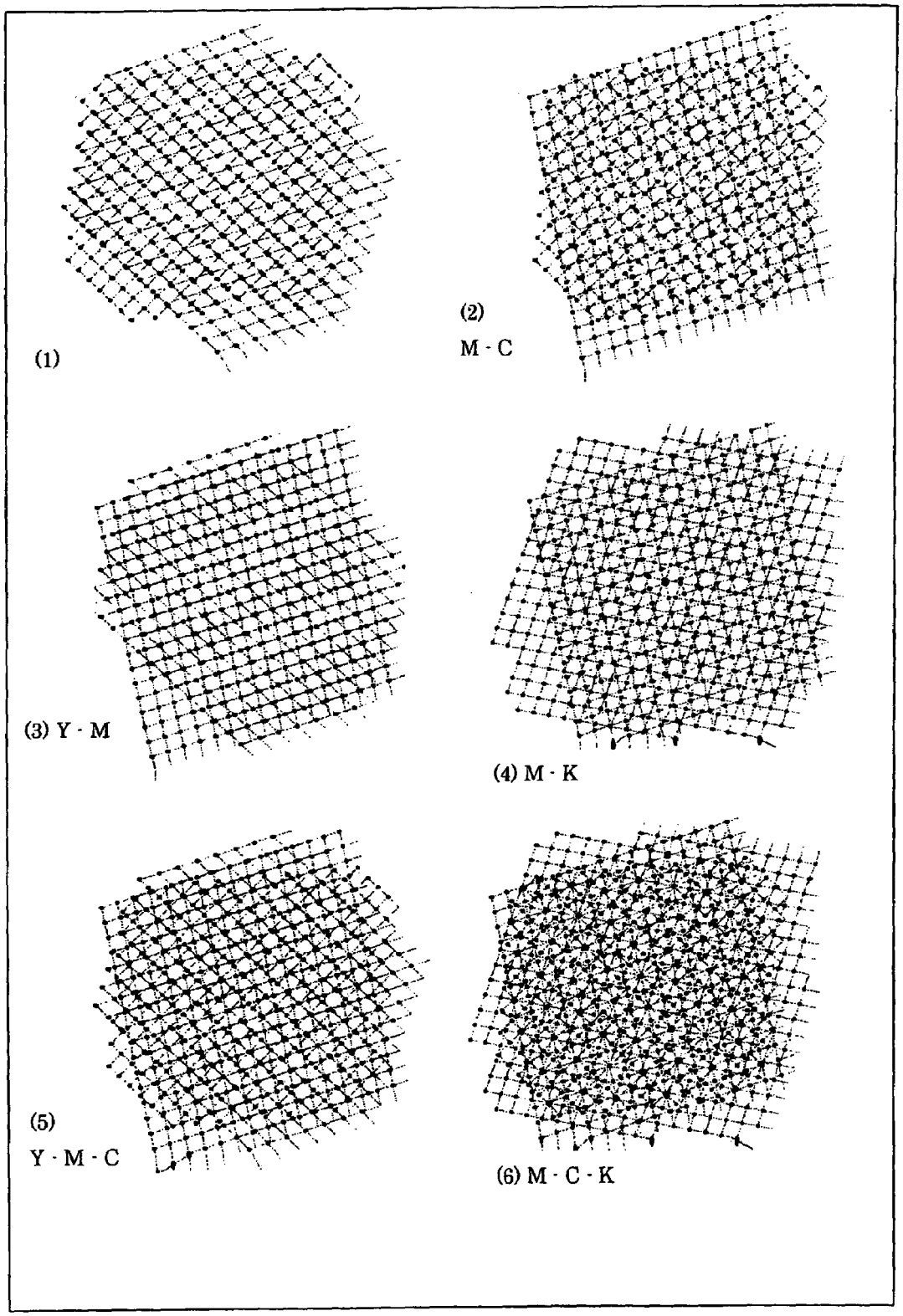
FIG. 26 shows superimposed states of the halftone dot patterns for the colors in the screen set of the second example.

FIG. 26 shows superimposed halftone patterns for the colors constituting the screen set of the second example. As can be seen from the figure, neither remarkable low-frequency moiré nor a rosette pattern emerges when two color screens are superimposed and when three color screens are superimposed.

Referring now to FIGS. 27 to 31, a third example of the specific halftone screen set according to the concepts of this embodiment will be described below.

Figure 27:
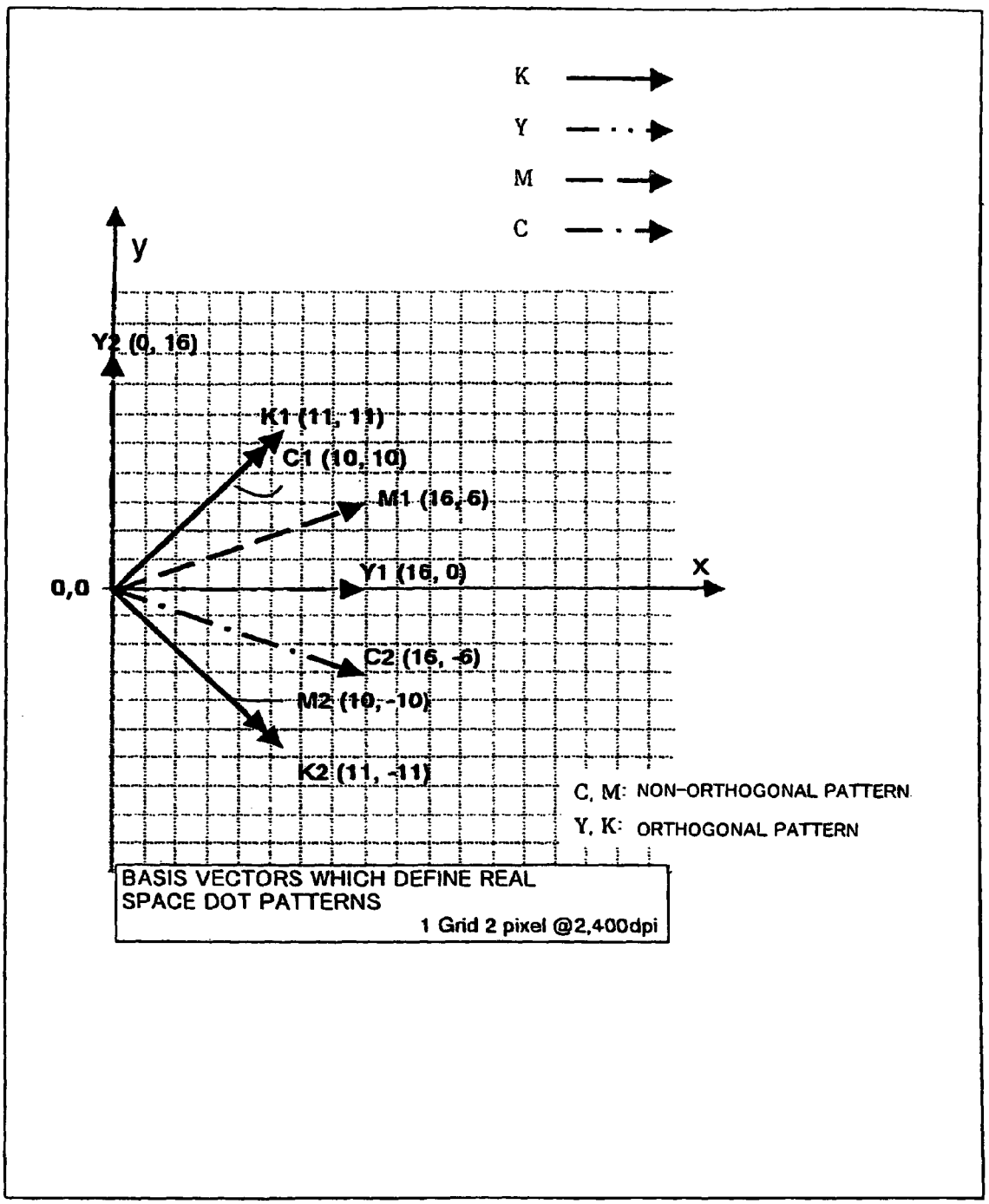
FIG. 27 shows basis vectors of halftone screens in a screen set of a third example.
Figure 28:
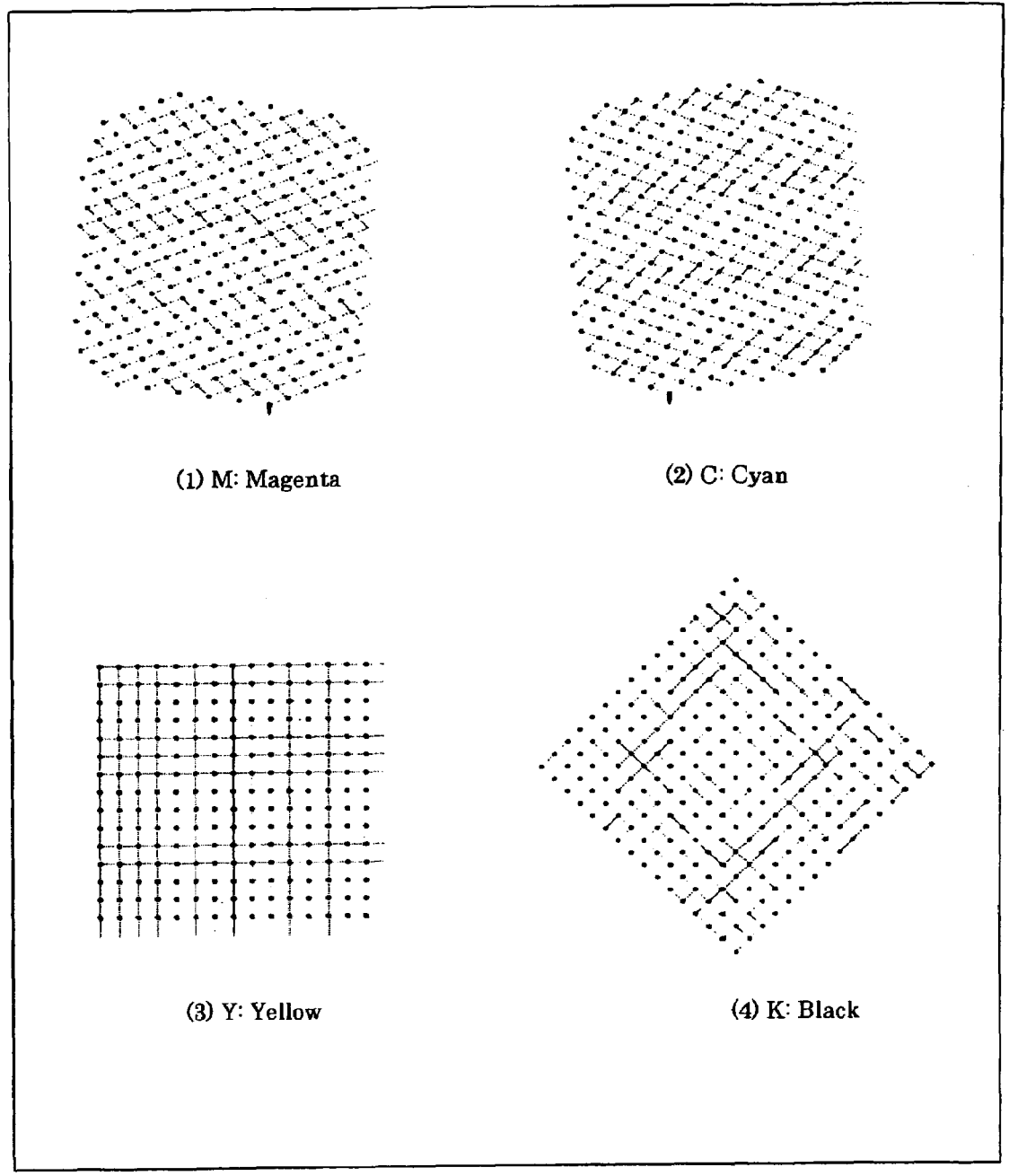
FIG. 28 shows halftone dot patterns of screens for colors M, C, Y, and K constituting the screen set of the third example.

FIG. 27 is a map showing basis vectors of each halftone screen in the halftone screen set. The screen set of this example is a four-color screen set having a resolution of 2400 dpi and a primary frequency band of 150-186 lpi. Each dot pattern of the halftone screens in the screen set is shown in FIG. 28. As can be seen from FIGS. 27 and 28, the screen set consists of screens for colors Y and K each having an orthogonal pattern, and screens for colors C and M each having a non-orthogonal pattern. Further, basis vector M2 is parallel to basis vector K2 and basis vector C1 is parallel to basis vector K1.

Figure 29:
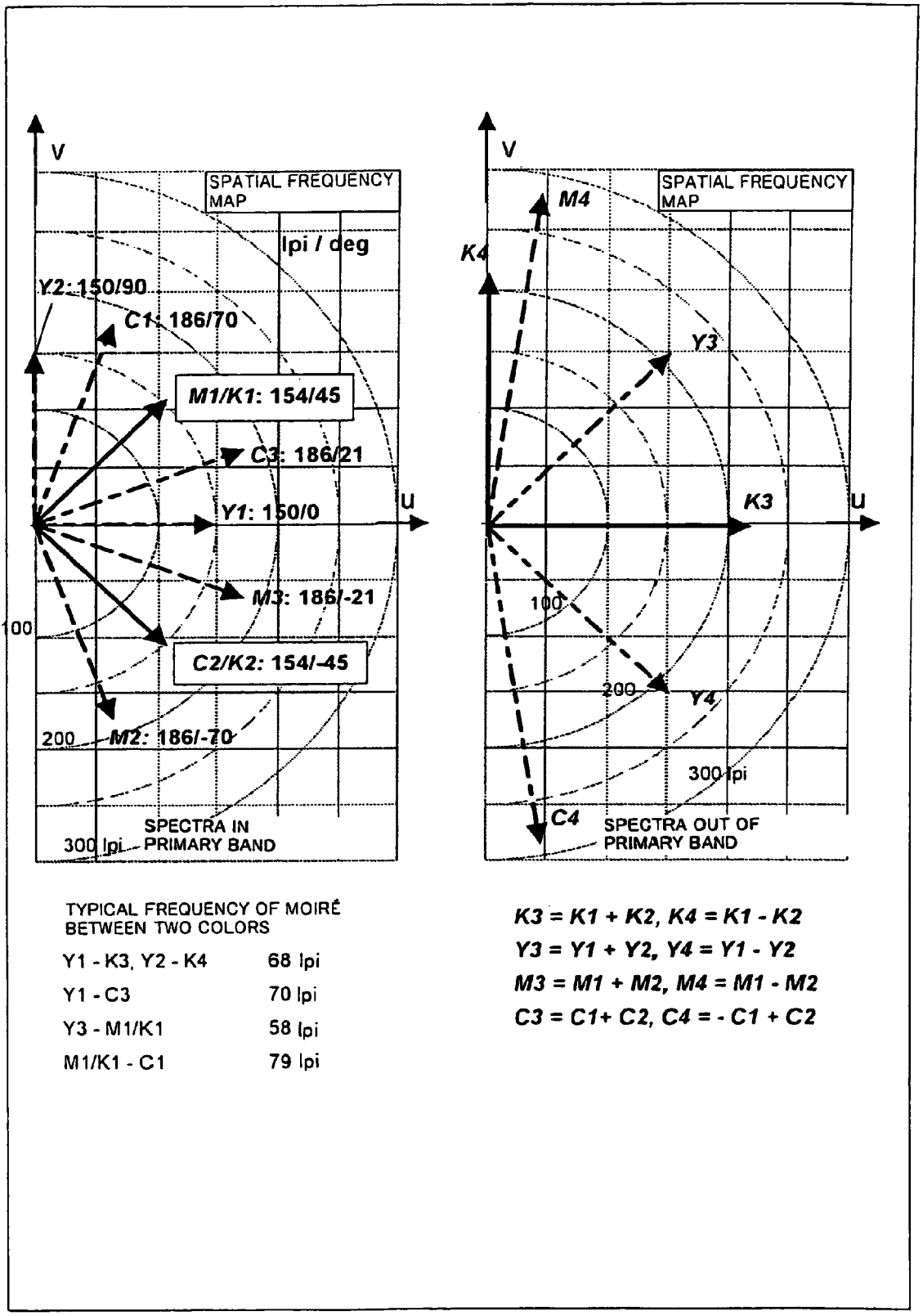
FIG. 29 is a diagram showing a map of spatial frequency spectra in a halftone dot structure for the colors in the screen set of the third example.

A set of spatial frequency spectra in the screen set of the third example has a relationship between the spatial frequency spectra as shown in FIG. 29. As shown in the figure, spectra M1 and K1 match each other, and spectra C2 and K2 match each other in the screen set of the third example. A commonality relationship of spectra among the four colors is shown in (a) of FIG. 30. In the screen set, spectra M3 and C3 among the secondary spectra are out of the primary frequency band of 150-186 lpi.

Figure 30:
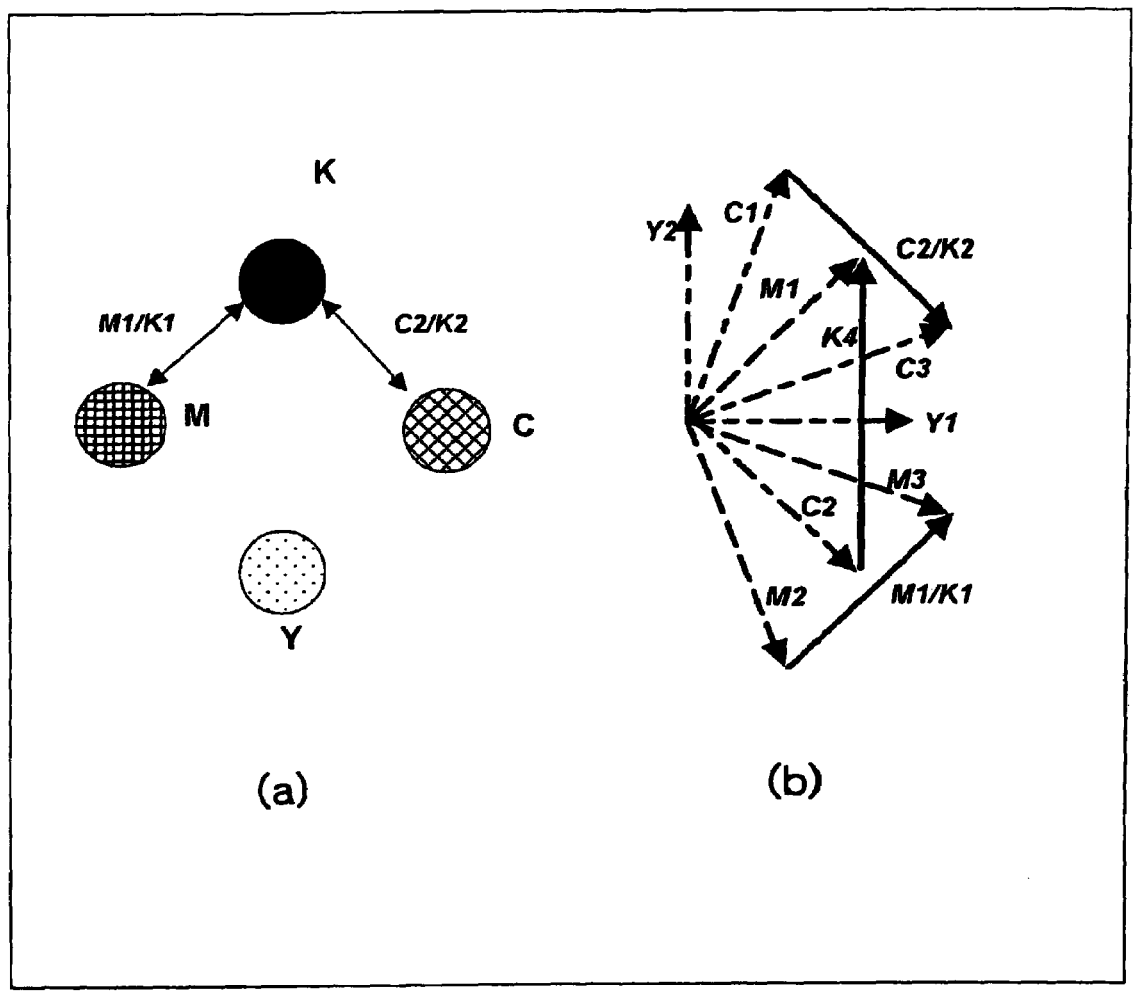
FIG. 30 shows a relationship of commonality between the spatial frequency spectra for the colors in the screen set of the third example and a relationship between screen vectors corresponding to the spatial frequency spectra.
Figure 31:
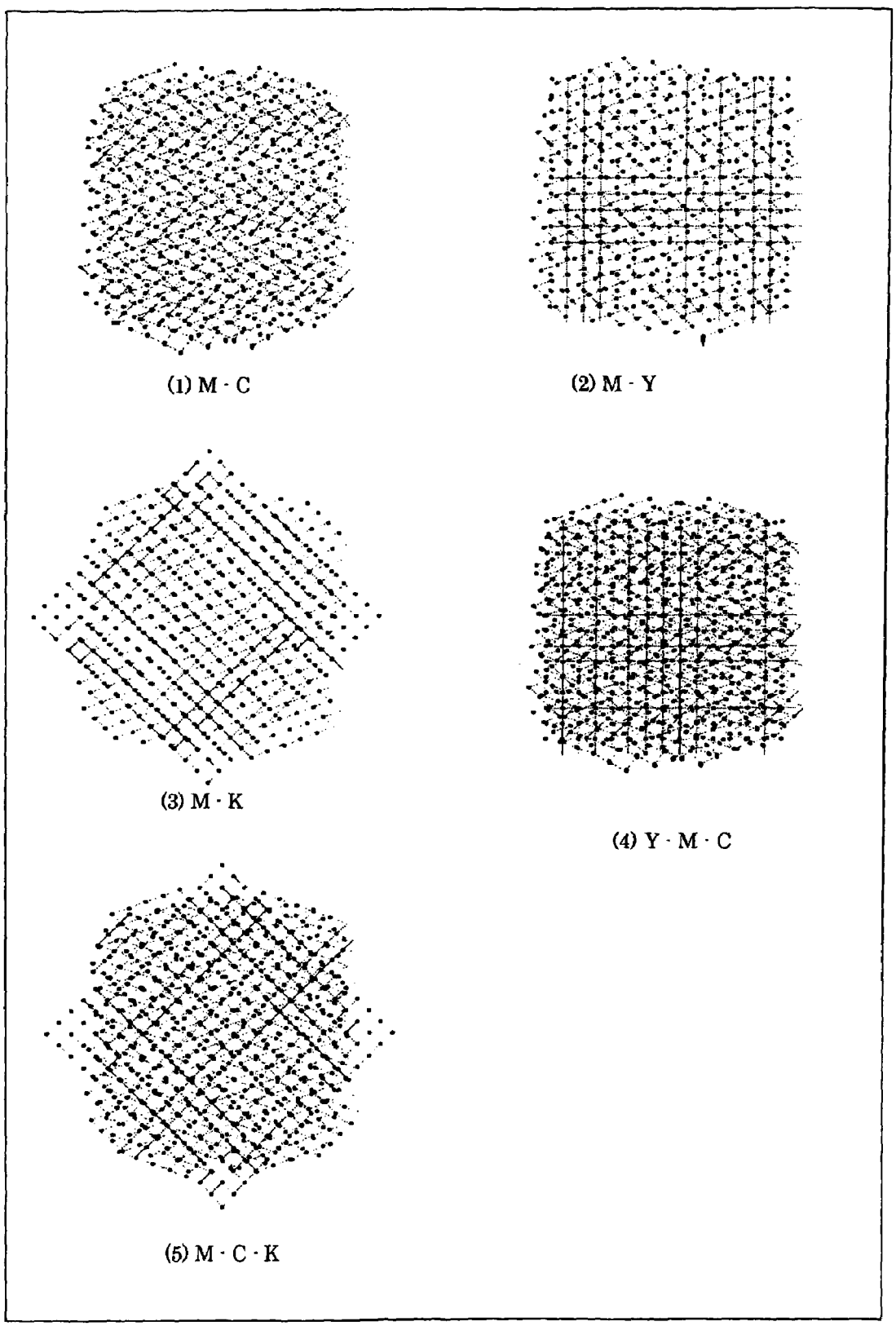
FIG. 31 shows superimposed states of the halftone dot patterns for the colors in the screen set of the third example.

Distinct from the above-described first and second examples, not all of screen vectors M1, M2, C1, C2, Y1, Y2, K1, and K2 are combined in the form of closed triangles in the third example (refer to FIG. 30(*b*)). On this account, the low-frequency moiré due to a tertiary color which emerges through combination of three colors remains in the third example.

On the other hand, although the number of different basis spectra within the primary frequency band is 6 in the screen set of the third example, secondary spectra of M3, C3 are contained in the primary frequency band, as a result of which the total number of spectra within the band becomes 8. Because the 8 different spectra are placed at almost uniform angle intervals, visibility of two-color moiré between the secondary spectra and the basis spectra is low. The frequency of two-color moiré actually emerging in the third example remains within the range of from 58 lpi to 79 lpi, which is higher than the 47 lpi of the lowest frequency of moiré emerging in the prior-art example of FIG. 2. The screens in the third example are designed so as to have screen ruling of 150-186 lpi. Even though this screen ruling is lower than 165-171 lpi of the prior-art example shown in FIG. 2, the screens can demonstrate moiré frequencies higher than that of the prior art.

Further, in the third example, the halftone dot pitch on the rows of halftone dots extending in the same direction also differ between M and K whose spectra are shared, and between C and K whose spectra are shared. Therefore, hue change due to registration error while superimposing the screens for M and K, or for C and K can be reduced.

Although a preferred form of the present invention has been described using specific examples, it is to be understood that the invention is not limited thereto. It is further understood by those skilled in the art that various changes and modifications may be made in the invention without departing from the spirit and scope thereof.

What is claimed is:

1. An image forming apparatus for digitally reproducing a color image using a screen set consisting of a halftone screen for each color, the screen set comprising:
   a first-color halftone screen having an associated first halftone pitch;
   a second-color halftone screen having an associated second halftone pitch measured in a corresponding direction to the first halftone pitch,
   a third-color halftone screen; and
   a fourth-color halftone screen, wherein
   two first screen vectors, one in each of the first and second-color halftone screens, each first screen vector being in a spatial frequency domain defined by a basis vector of a halftone dot pattern of the respective halftone screen, are parallel to each other,
   two second screen vectors, one in each of the first and second-color halftone screens, each second screen vector being in a spatial frequency domain defined by a basis vector of a halftone dot pattern of the respective halftone screen, are not parallel to each other,
   two second screen vectors, one in each of the third and fourth-color halftone screens, each second screen vector being in a spatial frequency domain defined by a basis vector of a halftone dot pattern of the respective halftone screen, are parallel to each other, and
   two first screen vectors, one in each of the third and fourth-color halftone screens, each first screen vector being in a spatial frequency domain defined by a basis vector of a halftone dot pattern of the respective halftone screen, are not parallel to each other.

2. An image forming apparatus according to claim 1, wherein said first-color halftone screen and said second-color halftone screen further satisfy a relationship that said first screen vectors are equal in magnitude.

3. An image forming apparatus according to claim 2, wherein at least one of said first-color and second-color halftone screens is a non-orthogonal screen.

4. An image forming apparatus according to claim 1, wherein
   said second screen vector of said first-color halftone screen matches secondary spectra represented by the sum or the difference of two screen vectors of said fourth-color halftone screen, and
   said first screen vector of said third-color halftone screen matches secondary spectra represented by the sum or the difference of two screen vectors of said second-color halftone screen.

5. An image forming apparatus according to claim 4, wherein
   said first screen vector of said first-color halftone screen, said first screen vector of said third-color halftone screen, and said second screen vector of said second-color halftone screen form a closed triangle, and
   said second screen vector of said first-color halftone screen, said first screen vector of said fourth-color halftone screen, and said screen second vector of said third-color halftone screen form a closed triangle.

6. An image forming apparatus according to claim 2, wherein said second screen vector of said first-color halftone screen matches either one of two screen vectors of a third-color halftone screen in said screen set.

7. An image forming apparatus according to claim 6, wherein a secondary spectrum represented by the sum or the difference of the two screen vectors of said first-color halftone screen matches either one of two screen vectors of a fourth-color halftone screen in said screen set.

8. An image forming apparatus according to claim 2, wherein
   said screen set comprises four color halftone screens, and
   the four color halftone screens have a relationship that two closed triangles can be formed using two screen vectors of each of the four color halftone screens, without a remainder.

9. An image forming apparatus according to claim 2, wherein in a case where directions of halftone dot arrangement match between said first-color and second-color halftone screens, halftone dot intervals in the matched direction of the first-color halftone screen differ from the halftone dot intervals in the matched direction of the second-color halftone screen.

10. An image forming apparatus according to claim 2, wherein
    said screen set comprises four color halftone screens, and
    among a total of 8 primary spatial frequency spectra each corresponding to one of the screen vectors for each color and a total of 8 secondary spatial frequency spectra each corresponding to the sum or the difference of the screen vectors for the same color, the number of different spatial frequency spectracontained in a band of from the minimum frequency to the maximum frequency of said 8 primary spatial frequency spectra is less than 8.

11. An image forming apparatus according to claim 10, wherein
    said screen set comprises four halftone screens, one for each color, and
    among a total of 8 primary spatial frequency spectra, each corresponding to one of the screen vectors for each color and a total of 8 secondary spatial frequency spectra, each corresponding to the sum or the difference of the screen vectors for the same color, the number of different spatial frequency spectra contained in a band of from the minimum frequency to the maximum frequency of said 8 primary spatial frequency spectra is 6.

12. An image forming method for digitally reproducing a color image, comprising:
    generating halftone images from input color images using a screen set consisting of multiple color halftone screens, the screen set comprises a first-color halftone screen having an associated first halftone pitch, a second-color halftone screen having an associated second halftone pitch measured in a corresponding direction to the first halftone pitch, a third-color halftone screen; and a fourth-color halftone screen, wherein
    two first screen vectors, one in each halftone screen, each first screen vector being in a spatial frequency domain defined by a basis vector of a halftone dot pattern of the respective halftone screen, are parallel to each other,
    two second screen vectors, one in each halftone screen, each second screen vector being in a spatial frequency domain defined by a basis vector of a halftone dot pattern of the respective halftone screen, are not parallel to each other,
    two second screen vectors, one in each of the third and fourth-color halftone screens, each second screen vector being in a spatial frequency domain defined by a basis vector of a halftone dot pattern of the respective halftone screen, are parallel to each other, and
    two first screen vectors, one in each of the third and fourth-color halftone screens, each first screen vector being in a spatial frequency domain defined by a basis vector of a halftone dot pattern of the respective halftone screen, are not parallel to each other, reproducing said input color images by combining said halftone images.

13. An image forming method according to claim 12, wherein said first-color halftone screen and said second-color halftone screen further satisfy a relationship that said first screen vectors are equal in magnitude.

14. An image forming method according to claim 13, wherein at least one of said first-color and second-color halftone screens is a non-orthogonal screen.

15. The image forming apparatus according to claim 1, wherein said first-color and second-color halftone screens are an orthogonal screen and a non-orthogonal screen.

* * * * *